US011055119B1

(12) United States Patent
Silverstein et al.

(10) Patent No.: US 11,055,119 B1
(45) Date of Patent: Jul. 6, 2021

(54) FEEDBACK RESPONSIVE INTERFACE

(71) Applicant: INTERNATIONAL BUSINESS MACHINES CORPORATION, Armonk, NY (US)

(72) Inventors: Zachary A. Silverstein, Jacksonville, FL (US); Indervir Singh Banipal, Austin, TX (US); Shikhar Kwatra, Durham, NC (US); Rodrigo Goulart Silva, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/802,217

(22) Filed: Feb. 26, 2020

(51) Int. Cl.
| G06F 3/08 | (2006.01) |
| G06F 9/451 | (2018.01) |
| G06N 3/08 | (2006.01) |
| G06N 3/04 | (2006.01) |
| G10L 15/22 | (2006.01) |
| G06F 40/56 | (2020.01) |
| G10L 15/26 | (2006.01) |

(52) U.S. Cl.
CPC .............. *G06F 9/453* (2018.02); *G06F 40/56* (2020.01); *G06N 3/0445* (2013.01); *G06N 3/08* (2013.01); *G10L 15/22* (2013.01); *G10L 15/26* (2013.01); *G10L 2015/223* (2013.01)

(58) Field of Classification Search
CPC ...................................... G06F 9/453
USPC ........................................ 715/705
See application file for complete search history.

(56) References Cited

U.S. PATENT DOCUMENTS

| 7,249,117 B2 * | 7/2007 | Estes ...................... G06N 5/022 706/52 |
| 7,702,500 B2 * | 4/2010 | Blaedow ................. G06F 40/40 704/9 |
| 7,783,486 B2 * | 8/2010 | Rosser .................... G10L 15/22 704/270 |

(Continued)

OTHER PUBLICATIONS

Mell, Peter, et al., "The NIST Definition of Cloud Computing", NIST Special Publication 800-145, Sep. 2011, Gaithersburg, MD, 7 pgs.

(Continued)

*Primary Examiner* — Reza Nabi
(74) *Attorney, Agent, or Firm* — Stephanie Carusillo, Esq.; George S. Blasiak, Esq.; Heslin Rothenberg Farley & Mesiti PC

(57) ABSTRACT

Methods, computer program products, and systems are presented. The method computer program products, and systems can include, for instance: obtaining during an interactive user support session user transmitted data including conversation content from a client computing device associated to the user; subjecting the user transmitted data to processing to provide feedback data associated to the conversation content obtained from the client computer device, wherein the feedback data indicates a level of satisfaction of the user, and wherein the processing includes subjecting content of the conversation content to natural language processing to return sentiment data of the user; examining data of the feedback data; performing selecting of a conversation strategy in dependence on the examining; and sending for presentment to the user returned conversation content in accordance with the certain conversation strategy.

20 Claims, 13 Drawing Sheets

(56) References Cited

U.S. PATENT DOCUMENTS

| | | | | |
|---|---|---|---|---|
| 8,214,238 | B1* | 7/2012 | Fairfield | G06Q 10/0639 |
| | | | | 705/7.11 |
| 8,517,258 | B2* | 8/2013 | Taylor | G06Q 30/0224 |
| | | | | 235/379 |
| 8,897,959 | B1* | 11/2014 | Sweney | B60W 50/16 |
| | | | | 701/36 |
| 9,678,948 | B2* | 6/2017 | Bhatt | G06F 40/30 |
| 9,779,370 | B2* | 10/2017 | Shen | G06Q 10/06 |
| 2003/0033192 | A1* | 2/2003 | Zyman | G06Q 10/06 |
| | | | | 705/7.36 |
| 2006/0242040 | A1* | 10/2006 | Rader | G06Q 40/06 |
| | | | | 705/35 |
| 2010/0049590 | A1* | 2/2010 | Anshul | G06Q 30/02 |
| | | | | 705/7.32 |
| 2010/0312769 | A1* | 12/2010 | Bailey | G06F 16/35 |
| | | | | 707/740 |
| 2011/0093295 | A1* | 4/2011 | Mankad | G06Q 10/10 |
| | | | | 705/3 |
| 2012/0123811 | A1* | 5/2012 | Socolof | G06Q 30/02 |
| | | | | 705/5 |
| 2014/0372250 | A1* | 12/2014 | Dugan | G06Q 30/0269 |
| | | | | 705/26.7 |
| 2015/0032724 | A1* | 1/2015 | Thirugnanasundaram | |
| | | | | H04L 51/32 |
| | | | | 707/722 |
| 2015/0088593 | A1* | 3/2015 | Raghunathan | H04L 51/32 |
| | | | | 705/7.27 |
| 2015/0157792 | A1* | 6/2015 | Chovanda | A61M 5/1723 |
| | | | | 604/504 |
| 2016/0335345 | A1* | 11/2016 | Wang | G06F 16/367 |
| 2017/0083817 | A1* | 3/2017 | Di Sciullo | G06N 5/022 |
| 2017/0102765 | A1* | 4/2017 | Yoneda | G06Q 30/0623 |
| 2017/0267171 | A1* | 9/2017 | Sweney | B62K 21/26 |
| 2018/0004718 | A1* | 1/2018 | Pappu | G06F 40/35 |
| 2018/0025726 | A1* | 1/2018 | Gatti de Bayser | G10L 15/22 |
| | | | | 704/257 |
| 2018/0108048 | A1* | 4/2018 | Yoon | G06Q 30/0271 |
| 2018/0165554 | A1* | 6/2018 | Zhang | G06K 9/6256 |
| 2018/0189554 | A1* | 7/2018 | Sutton | G06Q 30/0251 |
| 2018/0246883 | A1* | 8/2018 | Wang | G06F 40/30 |
| 2019/0005841 | A1* | 1/2019 | Loi | G06T 11/60 |
| 2019/0102820 | A1* | 4/2019 | Gupta | G06Q 30/0251 |
| 2019/0228427 | A1* | 7/2019 | Deluca | G06N 5/022 |
| 2019/0251126 | A1* | 8/2019 | Joseph | G06F 16/3329 |
| 2020/0135195 | A1* | 4/2020 | Ishikawa | G06Q 10/063114 |

OTHER PUBLICATIONS

"Global AI in Retail and e-Commerce Market 2019-2025: Market is Expected to Grow at a CAGR of 42.8%—Rising Shift Towards Omnichannel", May 23, 2019. Retrieved on Jun. 13, 2019 from the Internet URL: <https://www.prnewswire.com/news-releases/global-ai-in-retail-and-e-commerce-market-2019-2025-market-is-expected-to-grow-at-a-cagr-of-42-8---rising-shift-towards-omnichannel-300855879.html>, 6 pgs.

Sheard, T., "Increasing the Level of Abstraction in Traditional Functional Languages by Using Compile-time Reflection", M. Nivat et al. (eds.), Algebraic Methodology and Software Technology (AMAST'93), 8 pgs.

Wicklund, P., et al., "Chapter 3—Data Templates and Content", Professional Sitecore 8 Development, 2016, pp. 77-114.

Meyer, R., et al., "Faculty Advancement Support Technology (FAST) Final Project Report", May 3, 2007, 53 pgs.

Johann, P., et al., "Warm fusion in Stratego: A case study in generation of program transformation systems", Annals of Mathematics and Artificial Intelligence, 2000, 29: pp. 1-34.

* cited by examiner

FEEDBACK RESPONSIVE INTERFACE

BACKGROUND

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: obtaining during an interactive user support session user transmitted data including conversation content from a client computing device associated to the user; subjecting the user transmitted data to processing to provide feedback data associated to the conversation content obtained from the client computer device, wherein the feedback data indicates a level of satisfaction of the user, and wherein the processing includes subjecting content of the conversation content to natural language processing to return sentiment data of the user; examining data of the feedback data; performing selecting of a conversation strategy in dependence on the examining, wherein the performing selecting results in selection of a certain conversation strategy amongst a plurality of candidate conversation strategies that are referenced in a data repository; and sending for presentment to the user returned conversation content in accordance with the certain conversation strategy.

In another aspect, a computer program product can be provided. The computer program product can include a computer readable storage medium readable by one or more processing circuit and storing instructions for execution by one or more processor for performing a method. The method can include, for example: obtaining during an interactive user support session user transmitted data including conversation content from a client computing device associated to the user; subjecting the user transmitted data to processing to provide feedback data associated to the conversation content obtained from the client computer device, wherein the feedback data indicates a level of satisfaction of the user, and wherein the processing includes subjecting content of the conversation content to natural language processing to return sentiment data of the user; examining data of the feedback data; performing selecting of a conversation strategy in dependence on the examining, wherein the performing selecting results in selection of a certain conversation strategy amongst a plurality of candidate conversation strategies that are referenced in a data repository; and sending for presentment to the user returned conversation content in accordance with the certain conversation strategy.

In a further aspect, a system can be provided. The system can include, for example, a memory. In addition, the system can include one or more processor in communication with the memory. Further, the system can include program instructions executable by the one or more processor via the memory to perform a method. The method can include, for example: obtaining during an interactive user support session user transmitted data including conversation content from a client computing device associated to the user; subjecting the user transmitted data to processing to provide feedback data associated to the conversation content obtained from the client computer device, wherein the feedback data indicates a level of satisfaction of the user, and wherein the processing includes subjecting content of the conversation content to natural language processing to return sentiment data of the user; examining data of the feedback data; performing selecting of a conversation strategy in dependence on the examining, wherein the performing selecting results in selection of a certain conversation strategy amongst a plurality of candidate conversation strategies that are referenced in a data repository; and sending for presentment to the user returned conversation content in accordance with the certain conversation strategy.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
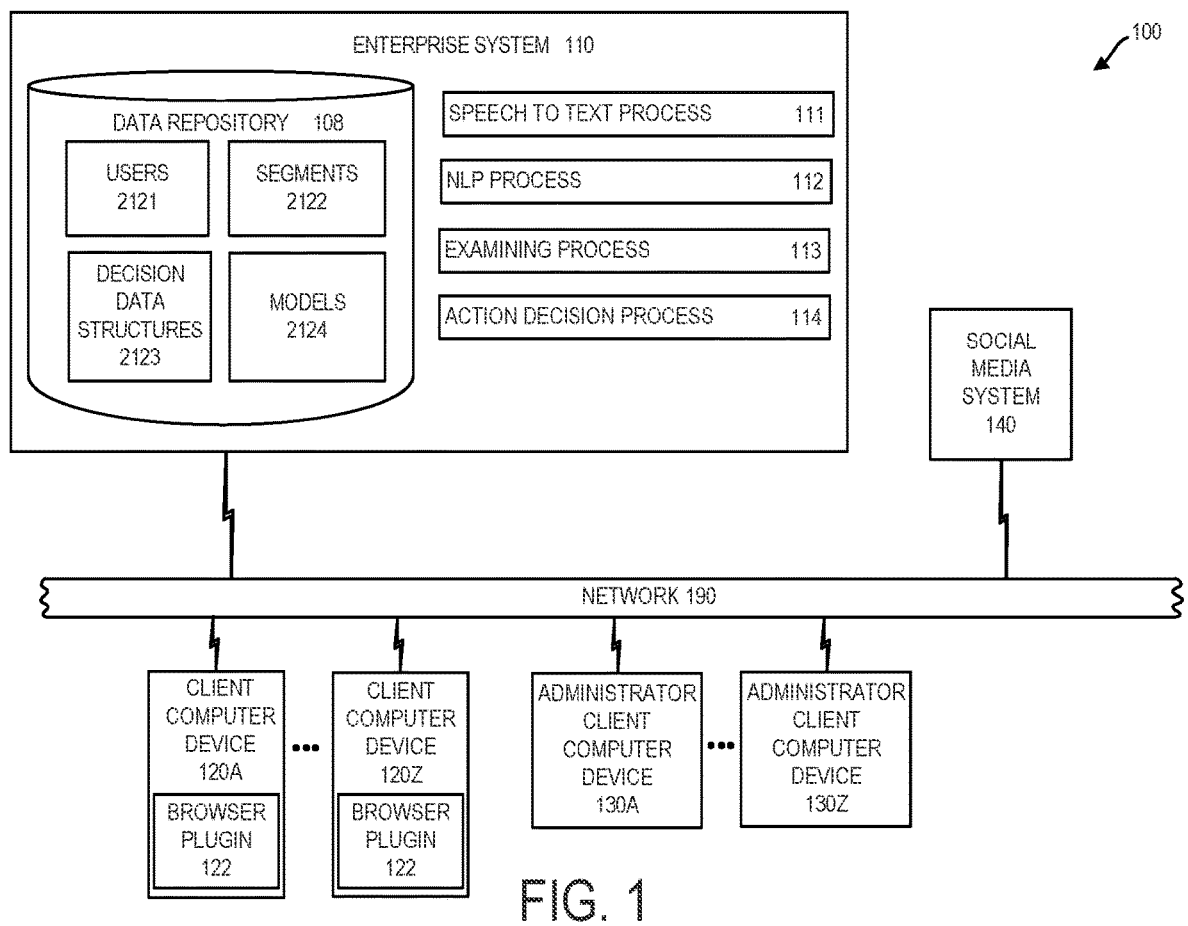
FIG. 1 depicts a system having an enterprise system, client computer devices, administrator client computer devices, and a social media system according to one embodiment.

System 100 for use in providing a sentiment responsive interface is shown in FIG. 1. System 100 can include enterprise system 110 having an associated data repository 108, client computer devices 120A-120Z, administrator client computer devices 130A-130Z and social media system 140. Enterprise system 110, client computer devices 120A-120Z, and administrator client computer devices 130A-130Z can be in communication with one another via network 190. System 100 can include numerous devices which can be computing node based devices connected by network 190. Network 190 can be a physical network and/or a virtual network. A physical network can be, for example, a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network. In one embodiment, enterprise system 110 can be external to client computer devices 120A-120Z and administrator client computer devices 130A-130Z.

In one embodiment, enterprise system 110 can be co-located with one or more of client computer devices of client computer devices 120A-120Z or client computer devices of administrator client computer devices 130A-130Z, or social media system 140. System 100 can be configured so that a strategy associated with a conversation mediated by enterprise system 110 can dynamically change in dependence on exhibited sentiment of a user associated with the client computer device. The conversation mediated by enterprise system can be e.g. a conversation in which enterprise system 110 runs an automated interactive voice response (IVR) session or other interactive user support session to a user such as a session in which enterprise system 110 guides an enterprise agent user in generating human defined conversation content, e.g. via key presses into a user interface and/or vocal utterances.

Client computer devices 120A-120Z can be computing node devices provided by a client computer, e.g., a smart phone or tablet, a laptop, smartwatch, or PC that runs one or more program e.g., including a web browser for opening and viewing web pages. Respective ones of client computer devices 120A-120Z can include browser plugin 122 that provides functions to facilitate participation in system 100.

Social media system 140 can include a collection of files including, for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS), text message delivery service of a mobile phone cellular network provider, or an email delivery system. In one embodiment, a messaging system can operate in accordance with the Internet Relay Chat (IRC) protocol. Enterprise system 110 can include a messaging system in one embodiment. During a process of registration wherein a user of system 100 registers as a registered user of system 100, a user sending registration data can send with permission data defining the registration data a permission that grants access by enterprise system 110 to data of the user within social media system 140. On being registered, enterprise system 110 can examine data of social media system 140 e.g. to determine whether first and second users are in communication with one another via a messaging system of social media system 140. A user can enter registration data using a user interface displayed on a client computer device of client computer devices 120-120Z. Entered registration data can include e.g. name, address, social media account information, other contact information, biographical information, background information, preferences information, and/or permissions data e.g. can include permissions data allowing enterprise system 110 to query data of a social media account of a user provided by social media system 140 including messaging system data and any other data of the user. When a user opts in to register into system 100 and grants system 100 permission to access data of social media system 140, system 100 can inform the user as to what data is collected and why, that any collected personal data may be encrypted, that the user can opt out at any time, and that if the user opts out, any personal data of the user is deleted.

Data repository 108 can store various data. In user's area 2121 of data repository 108, there can be stored data on users of system 100 such as registered users of system 100. According to one embodiment, enterprise system 110 can assign universally unique identifier (UUID) to registered users of system 100. According to one embodiment, enterprise system 110 can be associated to an enterprise such as an enterprise that provides services to user, e.g. online retail services, IT management support services, online financial services, insurance services and the like. User data of user's area 2121 can include, e.g. contact information of a user, e.g. name, address, social media addresses, phone number, and the like. User data of user's area 2121 can also include data on permissions provided by a user, e.g. permissions to use private data of a user in support of services provided by system 100. User data can also include preferences data of a user and configuration data of a user which can be data that controls operation of system 100 in performance of conversation enhancement services provided by enterprise system 110.

Segments area 2122 can store conversation text segments, e.g. in text form. According to one embodiment, segments area 2122 can store conversation text segments that support functions of enterprise system 110 in providing user support services to a user. For a given service, segments area 2122 can store alternative sets of conversation text segments, each of the different conversation text segments corresponding to a different conversation strategy. Embodiments herein recognize that different users can respond differently to different conversation strategies with the users. Conversation strategies can include, e.g. (a) empathy, (b) statistical reasoning, (c) paint new reality, (d) fear of missing out, (e) comparison with others, or (f) build trust and rapport. Examples of conversation text segments in accordance with an "empathy" conversation strategy can include e.g. "I'm sorry you are having this trouble."; "That must be difficult.", "That sounds like a challenging situation for you." An example of a conversation text segment in accordance with a "statistical reasoning" conversation strategy can include e.g. "The first option has a flat rate and the second option has a rate dependent on time of day used." An example of a conversation text segment in accordance with a "fear of missing out" conversation strategy can include e.g. "We have two left." Stored conversation text segments stored in segments area 2122 of data repository 108 can be text based. Enterprise system 110 can send selected conversation text segments via text based messaging or via synthesized voice with use of text to voice conversion processing.

Embodiments herein recognize that different users in different situations can respond differently in dependence on a conversation strategy employed for communication with the user. A first user may respond more positively with greater satisfaction when presented content in accordance with a statistical reasoning conversation strategy than the statistical reasoning strategy. A second user may respond more positively with greater satisfaction when presented content in accordance with an empathy strategy than a statistical reasoning strategy. Embodiments herein can improve performance of system 100 according to one embodiment by adjusting a conversation strategy in dependence on one or more factors, e.g. a current sentiment pattern of a user. Historical data of data repository 108 can be used in a determination of an optimal conversation strategy for engagement of a user.

In decision data structures area 2123, data repository 108 can store decision data structures for use in return of action decisions by enterprise system 110. Decision data structures can include, e.g. tables, graphs, lists, stacks, and decision trees. Decision data structures area 2123 can include, e.g. decision trees for use in guiding performance of an interactive user support session in which enterprise system 110 provides customer service to a customer user in relation to services provided by enterprise system 110. Decision data structure areas 2123 can include e.g. decision tables for use in return of action decisions in relation to selection of a conversation strategy. Data repository 108 in models area 2124 can store predictive models for return of action decisions. Predictive models can include, e.g. predictive models that model the behavior of a user or set of users in response to the presentment of conversation content in accordance with differentiated conversation strategies. Training data for use in training predictive models of models area 2124 can include, e.g. historical data stored in user's area 2121.

Enterprise system 110 can run various processes. Enterprise system 110 running speech to text process 111 can include enterprise system 110 examining received voice data from a user as output by an audio input device of client computer devices 120A-120Z in converting such voice data to text. Enterprise system 110 in turn, once text corresponding to speech is acquired, can input the return text to various process interfaces such as NLP process 112. Conversations mediated herein by enterprise system 110 can be text based or can be voice based. When conversation is voiced based, enterprise system 110 can convert voice to text and vice versa for facilitation of processing functions. Enterprise system 110 running a real time conference process can support a communication session provided by a chat session in addition to or in place of supporting a communication session provided by voice based conference session. For supporting a text based chat session, enterprise system 110 can operate in accordance with internet relay chat protocol (IRC) aspects of which are described in request for comments (RFC) 1459 updated by the following RFCs: 2810, 2811, 2812, 2813, and 7194. For support of a voice based chat session, enterprise system 110 can operate, for example, according to the real time transport protocol (RTP) which is a network protocol for delivering audio and video over IP networks. Aspects of the RTP protocol are described in RFC 3550 as referenced hereinabove. Enterprise system 110 running a real time conference process can include enterprise system running various communication controls for support of real time audio and/or video data communications. Enterprise system 110 running a real time conference process can include enterprise system 110 supporting communications between enterprise system and client computing device with use of the Real Time Transport Protocol (RTP) which is a network protocol for delivering audio and video over IP networks. RTP can run over user datagram protocol (UDP). RTP can be used in conjunction with RTP control protocol (RTCP). RTP can carry media streams, e.g. audio and video, and RTCP can be used to monitor transmission statistics and quality of service (QoS) which aides a facilitation of synchronization of multiple streams. RTP can be used to support voice over IP and can be used in connection with the signaling protocol such as the session initiation protocol (SIP) which establishes connections across a network. Aspects of the RTP are described in Request for Comments (RFC) 3550 published by the Internet Society (2003).

Enterprise system 110 can run natural language processing (NLP) process 112 to process data for preparation of records that are stored in data repository 108 and for return of action decisions. Enterprise system 110 can run a natural language processing (NLP) process 112 for determining one or more NLP output parameter of a message. NLP process 112 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" (emotion sentiment parameters), or analytical, confident, and tentative (style sentiment parameters) or other classification process for output of one or more other NLP output parameters e.g. one of more "part of speech" NLP output parameter.

By running of NLP process 112, enterprise system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment, sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Enterprise system 110 running NLP process 112 can include enterprise system 110 returning NLP output parameters in addition to those specifying topic and sentiment, e.g. can provide sentence segmentation tags, and part of speech tags. Enterprise system 110 can use sentence segmentation parameters to determine e.g. that an action topic and an entity topic are referenced in a common sentence for example.

Enterprise system 110 running examining process 113 can include enterprise system 110 examining sentiment data associated to conversation content of a user. The examining by enterprise system 110 running examining process 113 can include enterprise system 110 examining current sentiment data associated to current conversation content to a user. Current conversation content can include content from a current interactive user support session in which enterprise system 110 provides support services to a user. Enterprise system 110 running examining process 113 can include enterprise system 110 identifying features current sentiment data associated to current conversation content of a user during a current interactive user support session. A feature that can be detected for can include, e.g. an inflection point, local minimum, local maximum, a global minimum, or global maximum. According to one embodiment, an inflection point can be regarded as a point on which a continuous plain curve at which the curve changes from being concave (concave downward) to convex (concave upward) or vice versa.

Enterprise system 110 running action decision process 114 can include enterprise system 110 selecting a conversation strategy in dependence on result of enterprise system 110 running examining process 113. Conversation strategies herein can include, e.g. (a) empathy, (b) statistical reasoning, (c) paint new reality, (d) fear of missing out, (e) comparison with others, or (f) build trust and rapport. Returned action decisions can include, e.g. (i) retain existing conversation strategy for selection of a conversation strategy, or (ii) update the current strategy to a new specified strategy. Returned action decisions can include selection of a certain conversation strategy amongst candidate conversation strategies.

Figure 2:
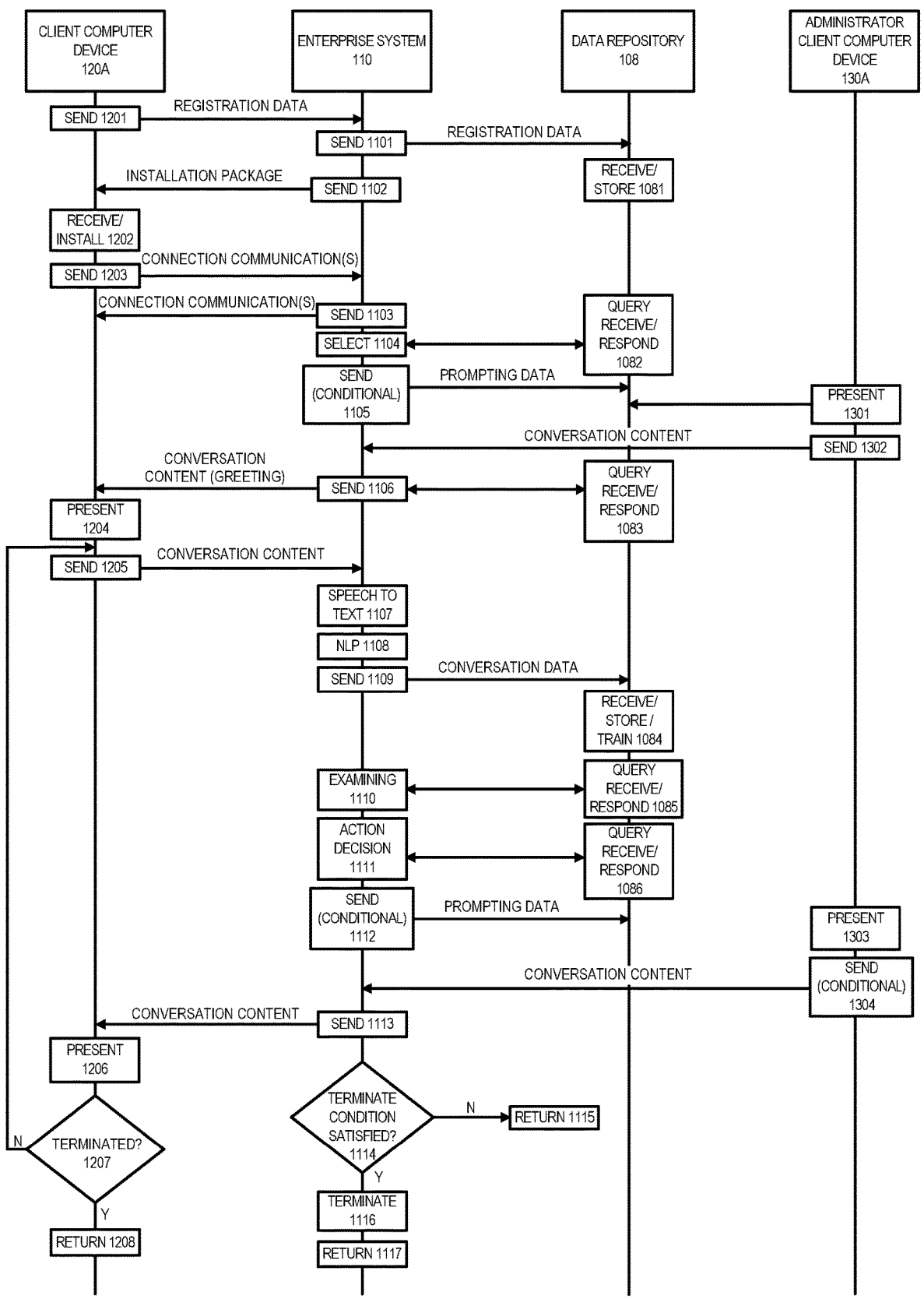
FIG. 2 is a flowchart illustrating a method for performance by an enterprise system interoperating with other components according to one embodiment.

The flowchart of FIG. 2 depicts method that can be performed by enterprise system 110 interoperating with client computer device 120A of client computer devices 120A-120Z and administrator client computer device 130A of administrator client computer devices 130A-130Z.

At block 1201, client computer device 120A can be sending registration data of a user to enterprise system 110. Registration data can be defined by a user of client computer device 120A and receipt of the registration data. Enterprise system 110 can send the registration data for receipt and storage by data repository 108 of enterprise system 110 at block 1081. Enterprise system 110 can send the described registration data at block 1101 to data repository 108.

In response to completion of block 1101, enterprise system 110 can proceed to block 1102. At block 1102, enterprise system 110 can sent an installation package to client computer device 120A for installation by client computer device 120A at block 1202. The installation package installed at block 1202 can include e.g. libraries and executable code that facilitate to the participation of client computer device 120A in system 100. The installed installation package can include browser plugin 122 (FIG. 1) that modifies operation of a web browser running on client computer device 120A. The browser plugin 122 in one aspect can cause received conversation content received by client computer device 120A from a data source other than enterprise system 110 to be forwarded for processing by enterprise system 110.

Figure 3:
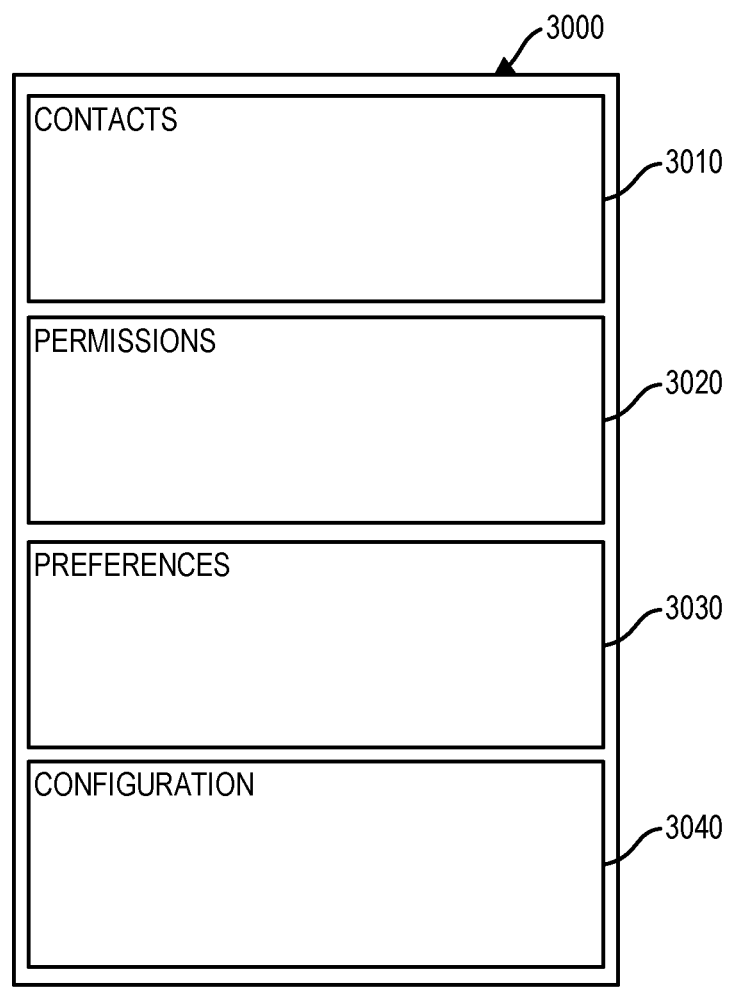
FIG. 3 depicts a user interface according to one embodiment.

Registration data can be defined by a user using user interface 3000 as shown in FIG. 3. User interface 3000 can be a displayed user interface displayed on display of a client computer device 120A-120Z. In contacts area 3010, the user can enter contact's information such as name, address, phone number, e-mail address, social media address, and so forth.

In permissions area 3020, a user can define permissions to facilitate use of personal data of a user by system 100. Permissions data defined in permissions area 3020 can include e.g., permissions to access user data stored on a client computer device of a user and permissions to access and use social media data of a user stored on a social media system such as social media system 140. A user in preferences area 3030 can specify preferences of a user, e.g., likes and dislikes, the products and services that are more important to a user, and what products and services are less important to a user.

Preferences area 3030 can present survey data to a user which is responded to by a user for extraction of preferences by the user. The user in configuration area 3040 can define configuration data defined by user which can include configuration data that specifies attributes of the operation of system 100 for a particular user.

At block 1203, client computer device 120A can send a connection request for receipt by enterprise system 110 which can responsively send a connection communication for receipt by client computer device 120A at block 1103. The connection communication sending at block 1203 and block 1103 can refer to client computer device 120A and enterprise system 110 establishing a client server connection. For connecting client computer device 120A to enterprise system 110, a client computer device 120A with use of a browser application can connect to a website hosted by enterprise system 110 for providing features set forth herein.

According to one embodiment, enterprise system 110 on completion of block 1103 can proceed to block 1104. At block 1104, enterprise system 110 can perform selection of an appropriate conversation strategy for use in sending conversation content at block 1106. The selecting at block 1104 can include one or more query of data repository 108. In response to receipt of a data query, data repository 108 can perform query receive and respond block 1082. Selection of an appropriate conversation test segment and/or conversation strategy can include multiple queries of data repository 108 and use of artificial intelligence (AI) as indicated by blocks 1104 and block 1083.

According to one embodiment, the sending of conversation content at block 1106 can be automated virtual agent (VA) based, i.e. can be generated by enterprise system 110. According to another embodiment as indicated by blocks 1105 and 1301, the conversation content sent at block 1106 can alternatively be conversation content defined by an enterprise agent user associated to administrator client computer device 130A. At block 1105, enterprise system 110 can send prompting data for receipt by administrator client computer device 130A. Administrator client computer device 130A in response to receipt of the prompting data can display the prompting data on a display of administrator client computer device 130A. The prompting data can prompt an enterprise agent user associated to administrator client computer device 130A to input a greeting according to a selected one of the noted greeting strategies A-F herein. The prompting data sent at block 1105 can prompt an enterprise agent user to enunciate a greeting in accordance with a selected conversation strategy selected at block 1104 via vocal utterance or keypad input. In response the enterprise agent and user defining conversation content at administrator client computer device 130A, administrator client computer device 130A at block 1302 can send the enterprise agent device conversation content to enterprise system 110, which can forward and send the conversation content to client computer device 120A at block 1106. In response to the receipt of the conversation content sent at block 1106, client computer device 120A can proceed to block 1204.

At block 1106, enterprise system 110 can send conversation content for receipt by client computer device 120A. Conversation content sent at block 1106 can include sending conversation content specifying an initial greeting to commence customer support. According to one embodiment, the greeting conversation content sent at block 1106 can be conversation strategy neutral, i.e. not associated with any particular one of the conversation strategies A-F set forth herein. According to one embodiment, the conversation content sent at block 1106 by enterprise system 110 can be associated to a particular selected conversation strategy of the conversation strategies A-F herein where the generation of conversation content at block 1106 can include enterprise system 110 performing one or more data queries on data repository 108 to return appropriate one or more conversation text segment. According to one embodiment, enterprise system 110 can intelligently select an appropriate conversation strategy with use of artificial intelligence (AI) processes as set forth herein. According to one embodiment, enterprise system 110 can intelligently select an appropriate conversation strategy with use of Eq. 1 as set forth herein.

At block 1204, client computer device 120A can present conversation content that had been sent by enterprise system 110 at block 1106. The presenting of block 1204 can include, e.g. presenting of audio conversation content by way of an audio output device and client computer device 120A and/or can include a text based output. For example, conversation content sent at block 1106 can be text based and/or client computer device 120A can include speech to text process for converting received voice data and text data. On completion of block 1204, client computer device can proceed to block 1205.

At block 1205, client computer device 120A can send conversation content to enterprise system 110 wherein the sent conversation content sent at block 1205 can be conversation content defined by a user of client computer device 120A. The user defined conversation content sent at block 1205 can be, e.g. text based or voice based. In response to the received conversation content sent at block 1205, enterprise system 110 can proceed to block 1107. Enterprise system 110 at block 1107 where the received conversation content is voice based can run speech to text process 111 to convert received speech into text.

On completion of block 1107, enterprise system 110 can proceed to block 1108 to perform natural language processing on converted text that has been converted at block 1107 (or on raw received text where the message is text based). Performance of block 1108 can include running of NLP process 112. According to one embodiment, enterprise system 110 running NLP block 1108 can include enterprise system 110 segmenting returned text into segments, e.g. sentences, topics and assigning topic tags and sentiment tags to the various returned segments. According to one segmentation scheme, enterprise system 110 can employ message based segmentation. In a message based segmentation scheme borders between segments can be defined by transitions between enterprise system 110 presenting conversation content and a user presenting conversation content. Enterprise system 110 can employ multiple segmentation schemes concurrently. Where a message based segment has multiple sentence segments enterprise system 110 can aggregate (e.g. average) sentiment values for the sentences to return an overall sentiment value for the message segment. At block 1108, enterprise system 110 can return topic tags such as entity topic tags wherein entity topics are identified in received text segments of a user. According to one embodiment, enterprise system 110 can assign sentiment data tags on a scale of 0.0 to 1.0, where the value of 1.0 indicates maximally positive sentiment and the value 0.0 specifies a lowest negative sentiment and the value 0.5 specifies neutral sentiment. On completion of the data tagging at block 1108, enterprise system 110 can proceed to block 1109.

At block 1109, enterprise system 110 can send conversation data for receipt and storage by data repository 108 at block 1084. The conversation data sent at block 1109 can include raw conversation content sent by client computer device to enterprise system 110 at block 1205 and/or can include structured conversation data which comprises, e.g. time stamped topic tags and sentiment tags returned at block 1108. Further at block 1084, data repository 108 can train one or more predictive models stored in models area 2124 of data repository 108. In one embodiment, stored data can define the training data described in connection with model 5002 and model 5004 herein. On completion of block 1109, enterprise system 110 can proceed to block 1110.

At block 1110, enterprise system 110 can perform examining of conversation data associated to received conversation content. The examining at block 1110 can include examining sentiment values over time. Sentiment values over time can define a sentiment data pattern and can include a most recent one or more sentiment value from an iteration of NLP block 1108. Examining at block 1110 can include identifying one or more feature associated to a current sentiment data pattern occurring within a current interactive user support session in which a client computer device is connected to enterprise system 110. One or more feature identified within a sentiment data pattern associated to a current interactive user support session can include, e.g. an inflection point of current sentiment data over time, a local minima of current sentiment data over time, local maxima, global minima, or global maxima. An identified feature of a current sentiment data can include e.g. one or more regression line feature such as a feature wherein regression line is identified as transitioning from a negative slope to a positive slope or vice versa. According to one embodiment, enterprise system 110 during respective iterations of examining block 1110 can plot a regression line with respect to current sentiment data. According to one embodiment with respect to regression line processing, time window processing can be used to eliminate from consideration aged data, e.g. sentiment data that is more than a threshold older than a current time (e.g. in terms of seconds or message segments). Thus, using a regression analysis, enterprise system 110 can predict whether sentiment of a user will become more positive or alternatively more negative. Enterprise system 110 performing examining block 1110 can include enterprise system 110 performing multiple data queries on data repository 108 which can be responded to by data repository 108 at query receive respond block 1085.

Figure 6A:
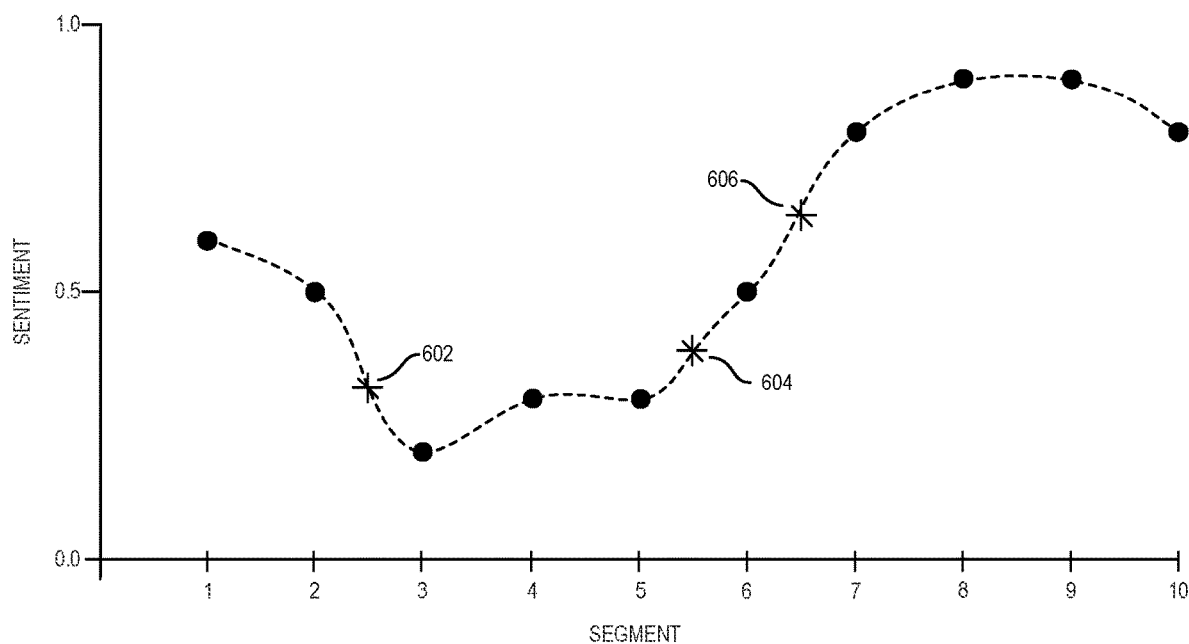
FIGS. 6A and 6B depict sentiment patterns associated with a user, and processing to detect features thereof according to one embodiment.
Figure 6B:
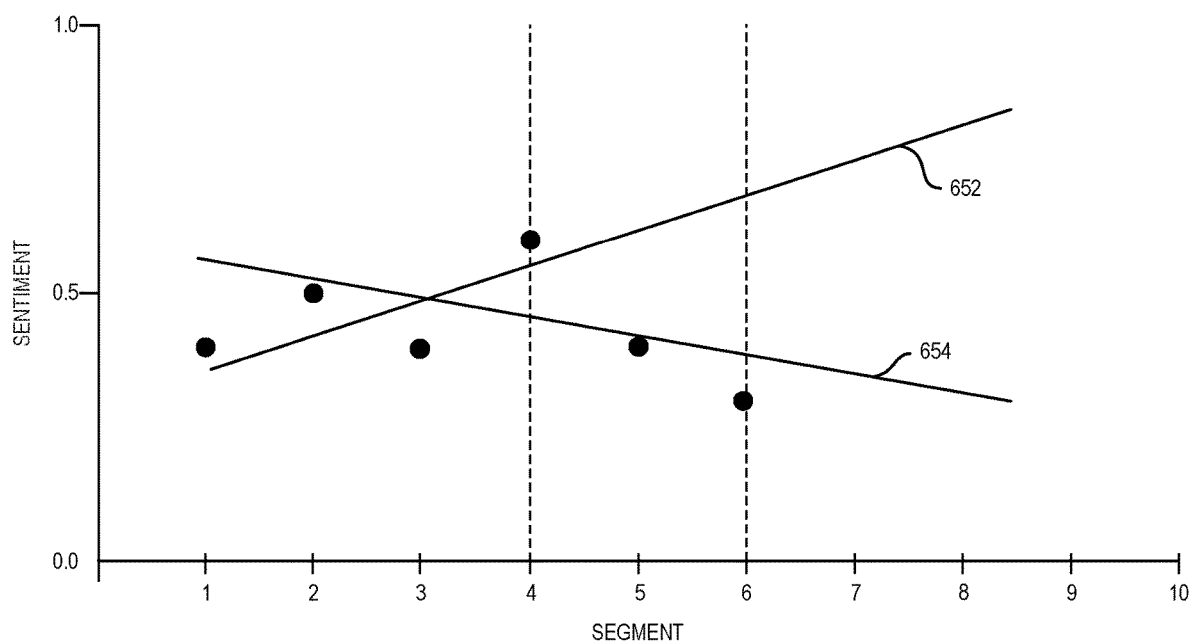

Additional aspects of identifying features within sentiment data patterns are described in reference to FIG. 6A and FIG. 6B. FIG. 6A illustrates a plot of time varying sentiment values of a user over time wherein sentiment values are plotted over time on a per message segment basis. In one embodiment, message segments can refer to time periods where a user presents conversation content and wherein different segments associated to user presented content are divided by periods in which enterprise system 110 (VA based or guided) is presented. Sentiment values per user message segment can be derived for an entire period in which a user presents conversation content that is sent to enterprise system 110. A message segment of a user can terminate when enterprise system 110 receives a user message (a text based message or a vocal utterance ending in a pause). Referring to the plot of FIG. 6A, enterprise system 110 can apply a curve fitting algorithm to fit a curve into the plotted sentiment values and based on the plotted curve can detect inflection points. In the described example of FIG. 6A, enterprise system 110 can determine that points 602, 604, and 606 are inflection points. The plotted points along the horizontal axis FIG. 6A can refer to the times at which enterprise system 110 completes processing of data for a certain message segment so that extracted data, e.g., sentiment data, associated to a segment is available for processing.

Another method for identification of a feature within time varying sentiment value is described in connection with FIG. 6B. Again in FIG. 6B, the data points for various segments can be data points of processing completion times for various segments of an interactive user support session in which a user in enterprise system 110 transmits conversation to one another on an alternating basis, and where sentiment value tags can be assigned to message segments of a user on a segment by segment basis. The embodiment of FIG. 6B can refer to time periods where a user sends conversation content to enterprise system 110. Segments associated to a user can have borders defined by times wherein enterprise system 110 sends conversation content to a user. FIG. 6B refers to enterprise system 110 detecting that a slope of a regression line has changed from a positive slope to a negative slope. At the time 4, when extracted data extracted by processing a fourth user segment is available, enterprise system 110 can determine that regression line 652 is the regression line for the current interactive user support session. At the time of time 6 when extracted data of a sixth user segment is available, enterprise system 110 can determine that regression line 654 is the regression line for the current interactive user support session. Thus, at time 6, enterprise system 110 can determine that a regression line for a current interactive user support session has transitioned from a positive slope to a negative slope regression line. In one embodiment, where the transition to negative slope causes the scoring value S to fall below a threshold as described in connection with Eq. 1, enterprise system 110 can select a new conversation strategy.

On completion of block 1110, enterprise system 110 can proceed to block 1111 to return an action decision. Enterprise system 110 performing block 1111 can include enterprise system 110 running action decision process 114. Enterprise system 110 performing action decision block 1111 can include enterprise system 110 returning the action decision, e.g. of the action decision can include, e.g. an action decision to retain a current conversation strategy or change transition to a new conversation strategy.

Enterprise system 110 at block 1111 in combination with examining block 1110 can apply Eq. 1 below for examination of data and selection of a conversation strategy.

$$S = W_1 F_1 + W_2 F_2 + W_3 F_3 \quad \text{(Eq. 1)}$$

Where S is a scoring value, where $F_1$, $F_2$, and $F_3$ are different factors, and wherein $W_1$, $W_2$, and $W_3$ are weights associated to different factors, according to one embodiment, $F_1$ can be a history factor, $F_2$ can be a sentiment value factor and $F_3$ can be a sentiment data pattern factor. $W_1$-$W_3$ can be weights associated to the various factors $F_1$-$F_3$. Enterprise system 110 can be configured so that enterprise system 110 retains a current conversation strategy when S exceeds a threshold and transitions to new conversation strategy when S is below a threshold.

Regarding the history factor $F_1$, enterprise system 110 can examine historical data of data repository 108 that specifies an optimal conversation strategy associated to certain user. For determination of a value under factor $F_1$ in one embodiment, enterprise system 110 can query predictive model 5002 as shown in FIG. 4A. Predictive model 5002 can be trained by machine learning to learn an optimal performing conversation strategy for a certain user. Enterprise system 110 can be configured to train for respective users of system 100 instances of predictive model 5002 for each domain recognized by system 100.

Figure 5A:
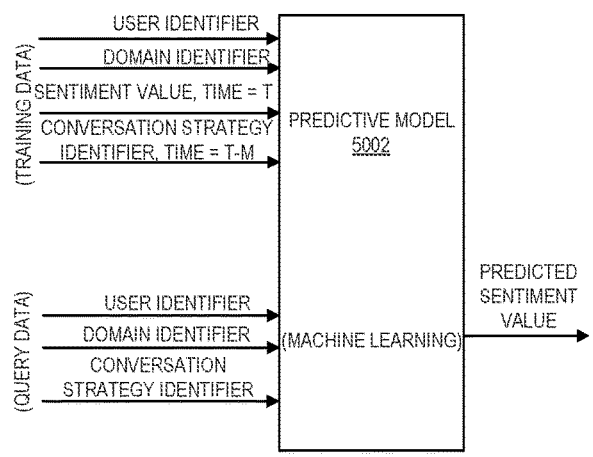
FIG. 5A-5B depict predictive models that can be trained by machine learning according to one embodiment.

Predictive model 5002 can be trained with training datasets and on completion of training can be configured to be responsive to data queries to return a prediction as to an optimally performing conversation strategy for the user. Predictive model 5002 can be trained with iterations of training datasets. Predictive model 5002, as shown in FIG. 5A, can be trained by supervised machine learning. Training datasets for training predictive model 5002 can include (a) user identifier, (b) domain identifier, (c) a conversation strategy identifier in combination with the outcome of (d) returned sentiment of a user in response to the conversation strategy. Regarding (d), enterprise system 110 can resolve entity data tags extracted from one or more segment to return a subject matter domain for a current interactive user support session mediated by enterprise system 110. Input sentiment parameter values input into predictive model 5002 can be expressed in one embodiment as polar nonbinary values on a scale of 0.0 (lowest negative) and 1.0 (highest positive).

Iterations of the dataset comprising (a), (b), (c), and (d) can be recorded into data repository 108 over time during the course of the user's use of system 100. For example, enterprise system 110 can be configured so that on receipt of conversation content from a client computer device, enterprise system 110 can extract a sentiment value and conversation strategy identifier associated to the conversation content, e.g. on a per message segment basis. To extract a conversation strategy identifier, enterprise system 110 can read a registry value of data repository 108 which tracks conversation strategies associated to outgoing conversation content. For example, on sending conversation content to a user at block 1113, the user can write a conversation strategy identifier for association to responsive conversation content of the user. On receipt of responsive conversation content from a user at a next iteration of block 1108, enterprise system 110 can read the conversation content identifier from the registry for associated to NLP output data tags being extracted. In another embodiment, to extract a conversation strategy identifier, client computer device 120A can be configured so that when sending conversation content to enterprise system 110 client computer device 120A can send the most recent conversation content received by client computer device 120A from enterprise system 110. Enterprise system 110, on receipt of the associated user conversation content and enterprise system conversation content, can subject the received content to natural language processing to extract sentiment data from conversation content of the user and the enterprise system. Based on the sentiment data for enterprise system presented conversation content, enterprise system 110 can determine a conversation strategy associated to the conversation content e.g. using a scatterplot analysis set forth in FIG. 7A herein.

On being trained with sufficient training data, predictive model 5002 can be configured to be responsive to query data. Query data for querying predictive model 5002 can include iterations of identifiers of all candidate conversation strategies that can be activated by enterprise system 110. In response to the query data for each candidate conversation identifier, predictive model 5002 can return a predicted sentiment value, e.g. on a scale of 0.0 (lowest negative) to 1.0 (most positive) which is a predicted sentiment value for the current user on being presented with conversation content in accordance with the specified conversation strategy. On the querying using all candidate conversation strategies, predictive model 5002 can return an ordered list that specifies an ordered ranking of best performing conversation strategies for the user for the current domain, and the predicted sentiment value associated to the respective candidate conversation strategies. Enterprise system 110 for assigning values under factor $F_1$ of Eq. 1 can examine the ordered list of sentiment parameter values associated to candidate conversation strategies returned by query of predictive model 5002. Enterprise system 110 can assign values under factor $F_1$ in dependence on an order of the ordered list and in dependence on the predicted sentiment value from the ordered list associated to the currently active conversation strategy. Enterprise system 110 can assign a first higher value under factor $F_1$ where the currently active conversation strategy is the highest ranked strategy for the user and/or where the predicted sentiment value for the user is within threshold percentage of the sentiment value associated to a highest ranked candidate conversation strategy. Enterprise system 110 can assign a second lower value under factor $F_1$ where the currently active conversation strategy is not the highest ranked strategy for the user and/or where the predicted sentiment value for the user is not within the threshold percentage of the sentiment value associated to a highest ranked candidate conversation strategy.

Figure 5B:
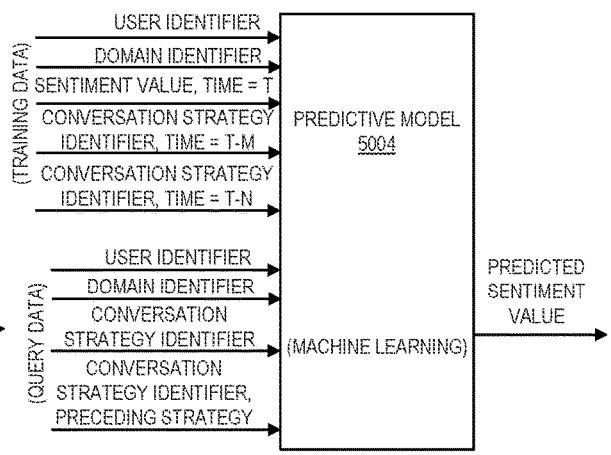

For determination of a value under factor $F_1$ in another embodiment, enterprise system 110 can query predictive model 5004 as shown in FIG. 5B. Predictive model 5004 can be trained to learn a user's behavior when being subject to presented content in accordance with a succession of changing conversation strategies. Embodiments herein recognize that some users may respond with particularly positive sentiment and/or satisfaction when there is a switch from strategy D to strategy A for example. Embodiments herein recognize that some other users may respond with particularly negative sentiment and/or satisfaction when there is a switch from strategy A to strategy B for example. Predictive model 5004 can be trained by machine learning to detect such trends.

FIG. 5B depicts predictive model 5004 trained to detect the user's behavior in response to being exposed to a sequence of different conversation strategies. Training data for training predictive model 5004 can include iterations of (a) user identifier, (b) domain identifier, (c) sentiment value at time T which can be a time associated to a certain message segment of the user, (d) a conversion strategy identifier at time T=T-M which can refer to an identifier of a conversation strategy associated enterprise system conversation content to which the user message segment at time=T is a response, and can also include (e) a training data conversation strategy identifier active at time=T-N, where time=T-N is earlier than time=T-M. The conversation strategy identifier for time=T-N can refer to the conversation strategy active by enterprise system 110 at a time preceding the conversation strategy active at time=T-M, prior to transition to the conversation strategy active at time=T-M. Predictive model 5004 can be iteratively trained with iterations of the described dataset comprising items (a) through (f) so that predictive model 5004 learns the behavior of a user in response to being subject to conversation content in accordance with changing conversation strategies. On being trained, predictive model 5004 can be capable of rendering a predicted sentiment value of a user in response to query data applied to predictive model 5004. Query data applied to predictive model 5004 can include a dataset including current user identifier, a current domain identifier, a strategy identifier currently active by enterprise system 110 and the strategy identifier for the conversation strategy active prior to the current conversation strategy. Thus, at any given point in time in the operation of enterprise system 110, enterprise system 110 can predict a sentiment response of a user in response to being subject to conversation in accordance with the succession of conversation strategies. Enterprise system 110 can use predictive model 5004 to predict the outcome of switching to a new conversation strategy. In such manner, a full set of conversation strategies can be evaluated in terms of their predicted performance. In one embodiment, the query data item "conversation strategy identifier" can refer to a prospective future candidate conversation strategy and the query data item "conversation strategy identifier for preceding strategy" can refer to the currently active conversation strategy. For each dataset including a different candidate conversation strategy, predictive model 5004 can output a different predicted sentiment value to generate an ordered list of ranked predicted sentiment values associated respectively to different perspective candidate conversation strategies. Enterprise system 110 can evaluate the different strategies using factor $F_1$ and Eq. 1 in the manner described for predictive model 5002. Enterprise system 110 for assigning values under factor $F_1$ of Eq. 1 can examine the ordered list of sentiment parameter values associated to candidate conversation strategies returned by query of predictive model 5002 and/or predictive model 5004 (both models can be used e.g. by employment of a voting or weighting scheme). Enterprise system 110 can assign values under factor $F_1$, in dependence on an order of the ordered list and in dependence on the predicted sentiment value from the ordered list associated to the currently active conversation strategy. Enterprise system 110 can assign a first higher value under factor $F_1$ where the currently active conversation strategy is the highest ranked strategy for the user and/or where the predicted sentiment value for the user is within threshold percentage of the sentiment value associated to a highest ranked candidate conversation strategy. Enterprise system 110 can assign a second lower value under factor $F_1$ where the currently active conversation strategy is not the highest ranked strategy for the user and/or where the predicted sentiment value for the user is not within the threshold percentage of the sentiment value associated to a highest ranked candidate conversation strategy.

Various available tools, libraries, and/or services can be utilized for implementation of predictive model 5002 and/or predictive model 5004. For example, a machine learning service can provide access to libraries and executable code for support of machine learning functions. A machine learning service can provide access to a set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. According to one possible implementation, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. Training predictive model 5002 and/or predictive model 5004 can include use of e.g. support vector machines (SVM), Bayesian networks, neural networks and/or other machine learning technologies.

Referring to factor $F_2$, factor $F_2$ can be a current sentiment value associated to a user. The current sentiment value associated to a user can be the current sentiment indicated by a user which can be a sentiment value associated to a most recent message segment of conversation content, e.g. message segment received from a user. When performing natural language processing on received conversation content, enterprise system 110 can perform segmenting of received content and can assign sentiment parameter values to segments of received content, such as nonbinary granular polar sentiment values, e.g. on a scale of 0.0 (lowest negative) to 1.0 (highest positive sentiment). Received content can be segmented on the basis e.g. message and/or sentence. Text based messages can be bounded by message send events. Voice based messages can be bounded by pauses. In one embodiment in the case of a text based or voice based conversation, all conversation content sent from the user between a time of receipt by the user of a last conversation content from enterprise system 110 and a subsequent conversation content from enterprise system 110 can be regarded to be a message segment. Polar nonbinary sentiment values on scale of 0.0 (lowest negative) to 1.0 (highest positive) can be extracted using a software utility that reports polar sentiment values. Polar nonbinary sentiment values on scale of 0.0 (lowest negative) to 1.0 (highest positive) can also or alternatively be provided by aggregating sentiment values of multiple classifications extracted using a software utility that reports sentiment values in multiple classifications (e.g. NLP output sentiment parameters, e.g. "anger," "disgust," "fear," "joy," and/or "sadness" (emotion sentiment parameters), or analytical, confident, and tentative (style sentiment parameters).

Enterprise system 110, according to factor $F_2$, can assign values under factor $F_2$ according to the returned sentiment parameter value. Thus, enterprise system 110 based on factor $F_2$ is more likely to retain a current conversation strategy when a returned current sentiment parameter value is of a relatively high value is less likely to retain a current conversation strategy when a returned current sentiment parameter value of a user is of a relatively low value.

Referring to factor $F_3$, factor $F_3$ can be a current sentiment pattern factor associated to a user. A current sentiment pattern refers to a sequence of sentiment values of a user within a current interactive user support session. The current sequence of sentiment values can refer to a succession of sentiment values associated to respective message segments in a sequence of successive message segments of a user. Enterprise system 110 under factor $F_3$ can identify one or more feature of sentiment pattern. A feature of a sentiment pattern can include e.g. an inflection point, a local minimum, a local maximum, a time where a regression line associated to a sequence of sentiment values transitions from negative slope to positive slope or vice versa.

Enterprise system 110 can assign a relatively higher value according to factor $F_3$ when a positive inflection point is observed (indicating a transition from negative to positive) and can assign a relatively lower value according to factor $F_3$ when a negative inflection point is observed (indicating a transition from positive to negative). Enterprise system 110 can assign a relatively higher value according to factor $F_3$ when a transition to a positive sloping regression line is observed (indicating a transition in sentiment from negative to positive), and can assign a relatively lower value according to factor $F_3$ when a transition from a positive to negative regression line is observed (indicating a transition from positive to negative). Referring again to the timewise plot of FIG. 6A enterprise system 110 can determine point 602 as an inflection point at time 3, at which time data extracted by processing of a third segment is available. Enterprise system 110 can determine point 604 as an inflection point at time 6, at which time data extracted by processing of a sixth segment is available. Enterprise system 110 can determine point 606 as an inflection point at time 7, at which time data extracted by processing of a seventh segment is available. There is set forth herein according to one embodiment obtaining during an interactive user support session user transmitted data including conversation content from a client computing device associated to the user; subjecting the user transmitted data to processing to provide feedback data associated to the conversation content obtained from the client computer device, wherein the feedback data indicates a level of satisfaction of the user, and wherein the processing includes subjecting content of the conversation content to natural language processing to return sentiment data of the user; examining data of the feedback data; performing selecting of a conversation strategy in dependence on the examining, wherein the performing selecting results in selection of a certain conversation strategy amongst a plurality of candidate conversation strategies that are referenced in a data repository; and sending for presentment to the user returned conversation content in accordance with the certain conversation strategy, wherein the examining includes identifying a feature within satisfaction level pattern data of the user defined by satisfaction level values for the user over time during the interactive user support session, wherein the selecting of the conversation strategy includes transitioning to a new conversation strategy, and wherein a time of the transitioning is in dependence on timing data of the feature. In the described embodiment, timing data can include the identified time at which an inflection point is observed. Enterprise system 110 can be configured to activate a new conversation strategy and select one or more conversation text segment at the time that a feature in satisfaction level pattern data is identified. For example, enterprise system 110 can transition to a next conversation strategy at time 3, at which time data extracted from a third segment is available for processing and inflection point 602 is detected. For evaluation of a transitioning condition using Eq. 2, enterprise system 110 can bias values assigned under factor $F_3$ in dependence on processing updated using data from a most recently received message segment.

The current sentiment value associated to a user can be a sentiment value associated to most recent conversation content received from a user. When performing natural language processing on received conversation content, enterprise system 110 can perform segmenting of received content and can assign sentiment parameter values to segments of received content, such as nonbinary granular polar sentiment values, e.g. on a scale of 0.0 (lowest negative) to 1.0 (highest positive sentiment). Received content can be segmented on the basis e.g. of message and/or sentence in the case of a text based messaging system. In the case of a voice based system, message segmenting can be performed on the basis of pauses. In one embodiment in the case of a text based or voice based conversation all conversation content received from time of receipt by the user of a last conversation content from enterprise system can be regarded to be a message segment.

Enterprise system 110 according to factor $F_2$ can assign values under factor $F_2$ according to the returned sentiment parameter value. It will be seen that enterprise system 110 based on factor $F_2$ is more likely to retain a current conversation strategy when a returned current sentiment parameter value is of a relatively high value and is less likely to retain a current conversation strategy when a returned current sentiment parameter value of a user is of a relatively low value. It can be seen from Eq. 1 that enterprise system 110 can be configured to transition to a next conversation strategy only under certain conditions. For example, the weight associated to the various functions $F_1$, $F_2$, and $F_3$ can be selected so that the scoring value S is incapable of exceeding the transition threshold when a current sentiment value for user is a positive sentiment value, i.e. a sentiment value exceeding 0.5.

Enterprise system 110 performing action decision block 1111 can include enterprise system 110 performing multiple data queries on data repository 108 as indicated by query receive and respond block 1086. On completion of block 1111, enterprise system 110 can proceed to block 1113.

At action decision block 1111, enterprise system 110 can select and obtain from data repository 108 an appropriate conversation segment stored in segments area of 2122. Return of an appropriate one or more text based conversation segment can be performed by enterprise system 110 with use of a decision data structure as is described in accordance with Table A below.

A decision data structure of Table A can include references to the listed conversation segments that are specified in Table A. Enterprise system 110 performing an action decision at block 1111 can further include enterprise system 110 selecting an appropriate subject matter domain. On selection of an appropriate subject matter domain, enterprise system 110 can select an appropriate decision data structure for guiding performance of a current interactive user support session in which enterprise system 110 provides support services to a user. Selected subject matter domains can include generic domains, e.g. banking, insurance, healthcare, information technology, computers, or can include specific domains (the model A00111 smartphone).

Figure 4:
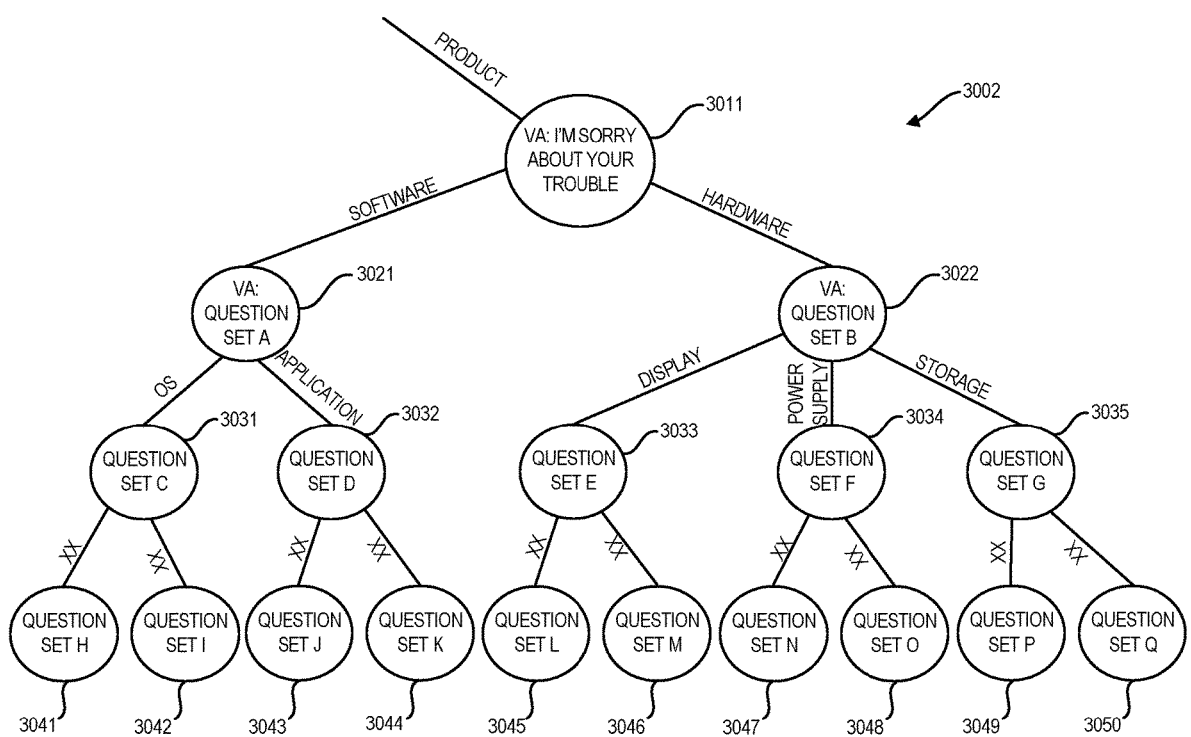
FIG. 4 depicts a decision tree for guiding a conversation according to one embodiment.

For performing block 1111, enterprise system 110 can use in one aspect decision tree 3002 as set forth in FIG. 4. Decision tree 3002 can be used by enterprise system 110 for guiding an interactive user support session with a user. In one aspect, enterprise system 110 can reference a decision tree such as decision tree 3002 for selection of one or more stored conversation text segment from data repository 108 in accordance with a selected and active conversation strategy. The decision tree 3002 shown as being in the domain of information technology can control the flow of conversation between enterprise system 110 which can provide a VA and a user in a customer support scenario. In reference to decision tree 3002, nodes represent questions of a VA and edges between nodes define interactive user support session states. Enterprise system 110 can be configured to reference a decision tree such as decision tree 3002 for return of an action decision as to the next VA question to present to a user participating in a current interactive user support session. For the state indicated by the edge entitled "product," a VA voice response can be depicted by node 3011 which designates the VA response of "What problem are you having?" which depicts a response in accordance with an "empathy" conversation strategy. Node 3011 depicts the case that the "empathy" conversation strategy was selected and active at the time of the node 3011 response. In the respective states referenced by the edges entitled "software" and "hardware", the response of a VA can be selected from a menu of candidate question sets, e.g., the question set A for node 3021 or the question set B for node 3022. The candidate question sets can include differentiated text segments each corresponding to a different conversation strategy. According to one embodiment, enterprise system 110 can select a question from a set of candidate questions in dependence on a selected and active conversation strategy. In iterations of the loop of blocks 1107 to block 1114, enterprise system 110 can examine entity topics extracted from user conversation content to determine a state of a current interactive user support session and the appropriate node to branch to. It should be noted that in some embodiments a large variety of decision trees can potentially activate enterprise system 110 in response to certain received voice data of user. In the middle of an interactive user support session, a first decision tree can be deactivated, and a second decision tree can be activated in response to certain voice data of a user. Decision tree 3002 can include nodes 3011, 3021-3022, 3031-3035, 3041-3050 mapping to VA voice response generation functions and edges between the nodes.

Referring to Table A, enterprise system 110 can use decision data structure shown at Table A for determination in selection of a stored conversation text segment from data repository 108 for presentment to user in dependence on a selected conversation strategy and a state of an interactive user support session with a user.

TABLE A

| Decision node | Conversation text segment (conversation strategy A) | Conversation text segment (conversation strategy B) | ... |
|---|---|---|---|
| 3021 | XXXX XX XXXXXX X XXXX | XX XXXX XXXXX XX | |
| 3022 | X XXX XXXXX XX XXX | XX X XXXXX XXXX XX | |
| 3023 | XXXX X XXXXX XXX XXXX | X XXX XXXXXX XX X XX XXXXX XXXXXXXX | |
| ... | ... | ... | ... |

Enterprise system 110 at block 1111 can examine a node referenced to a current stage of an interactive user support session and can use the decision data structure of Table A to select an appropriate conversation text segment. As illustrated in Table A, there can be associated to each decision node, e.g. decision node 3011, 3021, 3022, 3023, 3031, 3032, and so forth, a plurality of different conversation text segments associated to the respective differentiated conversation strategy. The differentiated conversation text segments can by authored and entered by an administrator user or can be automatically generated in response to an input of strategy neutral conversation content into a conversion process that extracts by natural language processing intents and entity domains from the input conversation content. In the case that conversation strategy A is active corresponding to conversation strategy (a) empathy, enterprise system 110 with use of the decision data structure of Table A can select the stored conversation text segment under the column "Conversation Text Segment (Conversation Strategy A)." If, on the other hand, conversation strategy (b) is active ("statistical reasoning"), enterprise system 110 with use of Table A can select the specified conversations text segment under column labeled "Conversation Text Segment (Conversation Strategy B)." On completion of action decision block 1111, enterprise system 110 can proceed to block 1113. At block 1113, enterprise system 110 can send the selected conversation text segment received from data repository 108 for to client computer device 120A for presentment by client computer device 120A to the user associated to client computer device 120A. Enterprise system 110 can send for presentment at client computer device 120A selected conversation text segments via text based messaging or via synthesized voice with use of text to voice conversion processing. According to one embodiment, conversation text segments described in connection with segments area 2122 and Table A can additionally or alternatively include stored conversation audio clip segments for sending by enterprise to client computer device 120A and playback by client computer device 120A.

FIG. 4 depicts the use case where custom text segments across different conversation strategies can be created for a plurality of different nodes that correspond to certain states of an interactive user support session. In another embodiment, the nodes of FIG. 4 can have associated therewith baseline conversation content that is independent of a selected conversation strategy and text associated to a selected conversation strategy is added to the baseline text in dependence on which conversation strategy is selected. In the embodiment of FIG. 4, particular conversation content presented to a user can be associated and differentiated based on state of an interactive user support session. In another embodiment, the conversation content presented to a user that is associated to a certain conversation strategy can be independent of a state of an interactive user support session.

In response to the receipt of the conversation content sent to client computer device 120A at block 1113, client computer device 120A at block 1206 can present the received conversation content, e.g. by way of an audio output device of client computer device 120A (in the case that the conversation content is audio based) and/or can present the received content as text based content, e.g. without conversion in the case that the received conversation content is text based or with conversion using a speech to text convertor in the case the conversation content is audio based. In response to completion of block 1206, client computer device 120A can proceed to block 1207. At block 1207, client computer device 120A can determine whether a current interactive user support session has been terminated. If the current interactive user support session has not been terminated, client computer device 120A can return to the processing stage prior to block 1205 to send additional conversation content defined by user of client computer device 120A to enterprise system 110. Client computer device 120A can iteratively perform the loop of blocks 1205, 1206, and 1207 until a current interactive user support session is determined to be terminated at block 1207. When a current interactive user support session is determined to be terminated at block 1207, client computer device 120A can proceed to block 1208.

At block 1208, client computer device 120A can return to the stage prior to block 1203 to wait for the user of client computer device 120A to enter one or more input to initiate a connection communication for support of an interactive user support session at block 1203. Referring again to block 1113, conversation content sent at block 1113 can be generated by virtual agent (VA) that is generated automatically by enterprise system 110. In an alternative embodiment, conversation content sent at block 1113 can be conversation content defined by an enterprise agent user of administrator client computer device 130A in response to receipt prompting data. In such alternative embodiment, enterprise system 110 in response to completion of block 1111 can proceed to block 1112. At block 1112, enterprise system 110 can send prompting data to administrator client computer device 130A. The prompting data sent at block 1112 can be prompting data that prompts an enterprise agent user associated to administrator client computer device 130A and enterprise system 110 to author conversation content appropriate for current stage node of a current interactive user support session.

Prompting data sent at block 1112 can include, e.g. the described selected conversation text segment selected with the decision data structure of Table A at block 1111 which has been selected in accordance with a currently active and selected conversation strategy also determined and selected at block 1111. At presentment block 1303, administrator client computer device 130A can present prompting data to enterprise agent user, e.g. audibly by an audio output device of administrator client computer device 130A and/or visually by a display of administrator client computer device 130A. In response to the observing of the presented prompting data at block 1303, an enterprise agent user can author and define conversation content for input into administrator client computer device 120A, e.g. by an audio based input that is input into an audio input device of administrator client computer device 120A or can type in text based data into a text based user interface of administrator client computer device 120A to define conversation content sent by administrator client computer device 120A at block 1304. On receipt of the prompting data specifying the selected conversation text segment, an enterprise agent user can either vocalize conversation content identical to the content specified having words identical to the conversation text segment specified in the prompting data or words inspired by the selected conversation text segment specified in the prompting data. By the enterprise agent user taking action to define conversation content, administrator client computer device 130A can send enterprise agent user defined conversation content to enterprise system 110 at block 1304. In an embodiment in which an enterprise agent user is a party to the conversation mediated by enterprise system 110, the enterprise agent user defined content sent at block 1304 can be relayed by enterprise system 110 to client computer device 120A at send block 1113. In another embodiment, prompting data sent by enterprise system 110 of block 1112 can include a text specifier that specifies a currently active conversation strategy in which a text specifier can be presented to the administrator client user at present block 1303.

In completion of send block 1113, enterprise system 110 can proceed to block 1114. At block 1114, enterprise system 110 can determine whether a terminate condition is satisfied for current interactive user support session being mediated by enterprise system 110. Enterprise system 110 can determine that a terminate condition has been satisfied, e.g. on the determination that all data specified on an item list has been received from the user and that at the most recent send block 1113, conversation closing content has been sent at conversation content send block 1113. On the determination at block 1114 that the terminate condition has not been satisfied, enterprise system 110 can proceed to block 1115.

At block 1115, enterprise system 110 can return to a stage prior to block 1107 so that enterprise system 110 can receive a next iteration of conversation content sent by client computer device 120A at a next iteration of send block 1205. Enterprise system 110 can iteratively perform the loop of blocks 1107-1114 until a terminate condition is satisfied at block 1114. While iteratively performing the loop of blocks 1107-1114, enterprise system 110 can be iteratively adjusting a currently active conversation strategy and can conceivably iteratively adjust a currently active conversation strategy multiple times during any interactive user support session. Enterprise system 110, on determination that a terminate condition has been satisfied at block 1114, can proceed to block 1116.

At block 1116, enterprise system 110 can terminate a current interactive user support session, e.g. by sending appropriate communications to client computer device 120A and administrator client computer device 130A (when active) to drop a current interactive user support session. On completion of terminate block 1116, enterprise system 110 can proceed to block 1117.

At block 1117, enterprise system 110 can return to processing stage preceding block 1103 to wait for next connection communication from client computer device 120A. Enterprise system 110 can contemporaneously be mediating multiple interactive user support sessions with multiple ones of client computer devices 120A-120Z.

According to one embodiment, the factors described in connection to Eq. 1 can be generalized to refer to "satisfaction level" values rather than sentiment values. For example, the return predictions returned using predictive model 5002 and/or predictive model 5004 can refer generally to satisfaction level values rather than sentiment values. Generated satisfaction level values like sentiment values can be provided in a range of values from 0.0 (lowest satisfaction) to 1.0 (highest satisfaction). According to one embodiment, satisfaction level values can be determined solely based on sentiment values. In another embodiment, satisfaction level values can be based on sentiment values as well as other parameters as are described further herein. According to another embodiment, a satisfaction level can be determined based solely on parameter values other than sentiment values. Referring further to generalized version of Eq. 1, factor $F_2$ and factor $F_3$ can refer generally to satisfaction level values. $F_2$ can be a satisfaction level value factor rather than a sentiment value factor, and $F_3$ can be referred to as a satisfaction data pattern factor rather than a sentiment data pattern factor. The timewise plots of FIGS. 6A and 6B can refer to plots of satisfaction level values rather than plots of sentiment values. The training data for training predictive model 5002 and model 5004 can be training data that specifies for instances where sentiment values are described satisfaction level values. There is set forth herein, according to one embodiment, obtained during an interactive user support session user transmitted data including conversation content from a client computing device associated to the user subjecting the user transmitted data to processing to provide feedback data associated to the conversation content obtained from the client computer device, wherein the feedback data indicates a level of satisfaction of the user, and wherein the processing includes subjecting content of the conversation content to natural language processing to return sentiment data of the user, examining data of the feedback data, performing selecting of a conversation strategy in dependence on the examining, wherein the performing selecting results in selection of a certain conversation strategy amongst a plurality of candidate conversation strategies that are referenced in a data repository, and sending for presentment to the user returned conversation content in accordance with the certain conversation strategy.

In one embodiment, enterprise system 110 can collect satisfaction level values of a user with use of biometric sensors such as one or more pulmonary sensor which can be disposed in respective client computer devices 120A-120Z. Enterprise system 110, for example, can determine that an increased heart rate of a user can be indicative of a low satisfaction level value and can assign lower satisfaction level value when a hastened heart rate is observed. A client computer device 120A can be in the form of a smart watch, for example, so as to provide accurate detection of heart rate using a pulmonary biometric sensor. Other forms of biometric sensors disposed in client computer device 120A can be used. In another example of a generalized satisfaction level value that can be collected from a user, enterprise system 110 can examine topic preferences of a user in connection with domain topics observed in a current interactive user support session and can assign higher satisfaction level values to a user in the case that observed entity topics extracted from conversation content of a user during a current interactive user support session that are unrelated to a determined domain topic match positive preferences of a user (meaning the user makes extraneous references to positive preferences during an interactive user support session).

Figure 7A:
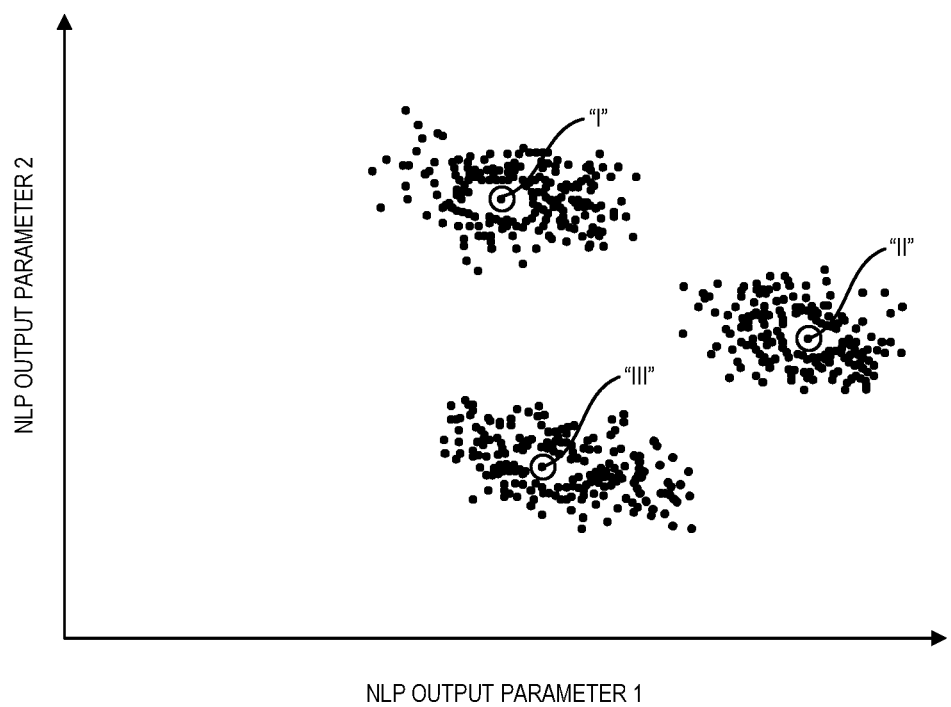
FIG. 7A depicts a scatterplot for detection of a conversation strategy according to one embodiment.
Figure 7B:
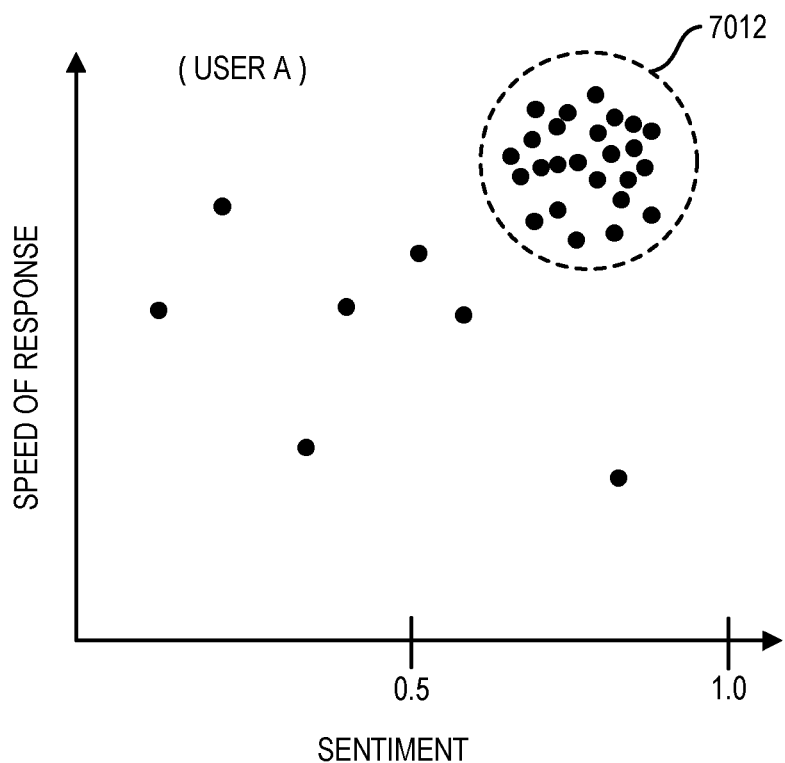
FIG. 7B depicts a scatterplot for use in detection of a satisfaction level based on speed of response according to one embodiment.

Enterprise system 110 can determine positive preferences of a user by activating NLP process 112 to process data entered in preferences area 3030 of user interface 3000 (FIG. 3) and/or post data of a user posted on social media system 140. In another example, for detection of a satisfaction level of a user, enterprise system 110 can examine speed of a response of a user, e.g., the speed of a response of a user in responding to presented conversation content sent by enterprise system 110, e.g. visually and/or audibly. Enterprise system 110, for example, can be configured to examine timing data specifying a time between initial presentation of content to a user and the time of the user's first keypad touch in response to a presentation of enterprise system conversation content. Client computer device 120A can generate such timing data by monitoring message receipt times and keypad touch times with use of a real-time clock. According to one embodiment, enterprise system 110 can use cluster analysis to determine whether the speed of response of a user is indicative of user satisfaction. For example, enterprise system 110 can be plotting for all users based on all incoming data incoming into enterprise system 110 for each segment a sentiment value of the user's conversation content plotted against speed of response. In reference to FIG. 7B, enterprise system 110 in the case a high-density cluster 7012 is identified correlating threshold exceeding positive sentiment to threshold exceeding response speed for a given user, enterprise system 110 can set a flag in data repository 108 indicating that for the given user (user A as shown in FIG. 7B) in which the trend is identified, a threshold exceeding fast response time is indicative of a threshold exceeding positive sentiment value and satisfaction level of the user. Response speed data, e.g. as defined by the described timing data, for processing by enterprise system 110 for derivation of satisfaction level values can be sent by client computer device 120A at block 1205 as part of user transmitted data sent with conversation content.

Figure 7C:
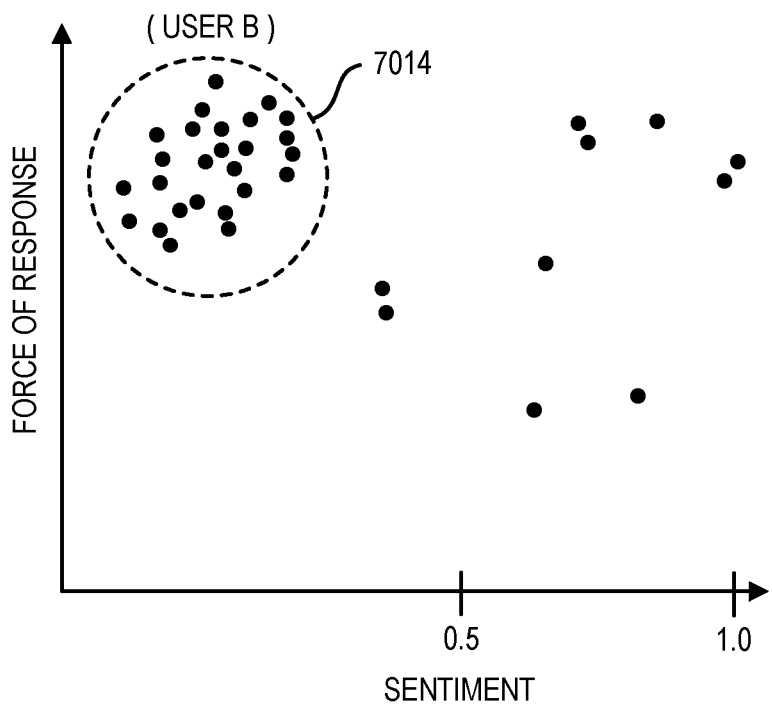
FIG. 7C depicts a scatterplot for use in detection of a satisfaction level based on applied force of a response according to one embodiment.

Referring to the scatterplot of FIG. 7C, enterprise system 110 for all users and for all conversation content digested can be maintaining scatterplots as indicated by FIG. 7C which plot sentiment values associated to received conversation content of users, e.g. as divided by segments in connection with a force of a response. The force of a response can refer to the Z axis force applied by a user to a user interface of client computer device 120A-120Z. Client computer devices of client computer devices 120A-120Z can have keypads that have Z axis force sensors for sensing a finger application force of a user when the user uses a user interface. The illustrative scatterplot of FIG. 7C for User B in which high density cluster 7014 is identified indicates that User B tends to use high threshold exceeding force on a keypad when exhibiting low negative sentiment below a low threshold. Accordingly for User B, enterprise system 110 when returning scoring values S with use of Eq. 1 can assign lower satisfaction level values and sentiment values when applying factors $F_2$ and $F_3$ on the condition that a high threshold exceeding force is detected on a keypad of client computer device 120A and also when reporting satisfaction level values or sentiment values at block 1109 for storage and training of predictive models such as predictive models 5002 and model 5004. Force data for processing by enterprise system 110 for derivation of satisfaction level values can be sent by client computer device 120A at block 1205 as part of user transmitted data sent with conversation content.

At block 1084, enterprise system 110 can apply training data in accordance with the labels depicted in FIGS. 5A and 5B for training respective predictive model 5002 and predictive model 5004. The training data can be training data obtained from the current interactive user support session, e.g. can be training data derived from conversation content received and processed at blocks 1107 and 1108 during a current interactive user support session (in session training data). Predictive model 5002 and predictive model 5004 can be trained with use of in session generated training data from a current interactive support session mediated by enterprise system 110 as well as other interactive support sessions mediated by enterprise system 110.

Embodiments herein will recognize however that training data for training predictive model 5002 and predictive model 5004 can be collected from interactive conversations participated in by a user of a client computer device other than interactive user support sessions mediated by enterprise system 110. Training data can be obtained from conversations participated in by client computer device, e.g. client computer device 120A mediated by a computing node based system other than enterprise system 110 that is external to enterprise system 110. For example, training data can be obtained using conversation data of a conversation mediated by social media system 140 or another data source external to enterprise system 110 which does not run examining process 113, action decision process 114, and which does not include, e.g. segments area 2122 for support of content presentment aspects of the method described in connection with the flow chart of FIG. 2.

With conversation data reported at block 1109, enterprise system 110 can report data tags for use in training of predictive models 5002 and 5004 such as data tags that indicate a user identifier, a domain identifier, sentiment satisfaction level indicating data tags, (e.g. sentiment values or other parameter values), and data tags indicating conversation strategies associated with the presented conversation content sent by enterprise system 110 to a client computer device. In one scenario as set forth herein, conversation strategy identifier data tags can be read from a registry of data repository 108. For example, enterprise system 110, when selecting a certain conversation strategy, can update the registry so that enterprise system 110 can appropriately associate conversation strategy identifier data tags to user conversation data tags. In some embodiments, enterprise system 110 on the selection of a certain conversation strategy can inject conversation strategy data tags into sent conversation content sent to client computer device 120A and client computer device 120A can appropriately return the injected conversation strategy indicating data tags into a response conversation content sent by a client computer device to enterprise system 110. In such scenarios, conversation strategy identifier data tags can be generated by enterprise system 110 on selection of a conversation strategy.

In some embodiments, a conversation strategy identifier of conversation content can be determined heuristically without reliance on any registry data set by enterprise system 110 or other tag generating by enterprise system 110 in response to selection of a conversation strategy. In the development of a corpus of text segments or storage into segments area 2122 or data repository 108, an administrator user associated with the operating enterprise system 110 can run NLP process 112 to return signature data for each segment recorded according to one of a set of candidate conversation strategies. With a significant corpus of data stored in segments area 2122, a scatterplot as shown in illustrative FIG. 7A can be generated. The clusters having respective centroids I, II, and III as shown in the scatterplot of FIG. 7A can correspond to different ones of the different conversation strategies (a) through (e) as set forth herein and each data point in the scatterplot of FIG. 7A can specify values of first and second NLP output parameters for arbitrary conversation content received by enterprise system 110 (e.g. can be from a conversation mediated by a data source external to enterprise system 110). Enterprise system 110 can iteratively test alternative sets of first and second NLP output parameters on the corpus of conversation text segments within data repository 108 until clusters strongly correlated with the respective distinct conversation strategies are identified.

Accordingly, referring to FIG. 7A, it can be seen that enterprise system 110 can heuristically classify any arbitrary conversation content as belonging to one of the available conversation strategies A-F based on Euclidian distance to the nearest centroid in the scatterplot of FIG. 7A without a conversation content having been prelabeled with any conversation strategy data tag generated by enterprise system 110. Because conversation strategy identifiers can be derived heuristically, enterprise system 110 can conceivably use any conversation data of any conversation participated in by a user to obtain training data for training of predictive model 5002 and predictive model 5004 according to all of training dataset parameter values described in connection with FIG. 5A and FIG. 5B. Conversation data of conversations not mediated by enterprise system 110 can be usefully mined by enterprise system 110 for obtaining of training data for application of predictive model 5002 and predictive model 5004 where permissions of a user facilitate such training. According to one embodiment, the installation package sent by enterprise system 110 at block 1102 for installation by client computer device 120A at block 1202 can include a function to define web browser plugin 122 as shown in FIG. 1 that causes conversation data received by client computer device 120A from a data source external to enterprise system 110 such as social media system 140 to be forwarded to enterprise system 110 by browser plugin 122 of client computer device 120A for mining of training data tags for use in training of predictive models such as predictive models 5002 and 5004 for support of an interactive user support session. As set forth herein, according to one embodiment, a method wherein the method includes receiving from a client computer device conversation associated data, the conversation associated data being associated to a conversation mediated by a computing node based system external to a computing node based system that mediates the interactive user support session, wherein the method includes subjecting the conversation associated data to natural language processing to extract natural language processing output parameters associated to the conversation associated data, examining the natural language processing output parameters to heuristically derive a conversation strategy identifier for the conversation associated data, using the conversation strategy identifier to train a predictive model, and wherein the performing selecting of a conversation strategy includes querying the predictive model.

Referring to the scatterplot machine learning features described with reference to FIG. 7B and FIG. 7C, it will be seen that training data for learning attributes associated with a user's speed of response and force of response can likewise be based on conversation data received by client computer device, e.g. client computer device 120A from a data source external to enterprise system 110, e.g. social media system 140, which conversation data on receipt by client computer device 120A can be forwarded to enterprise system 110 by browser plugin 122 for mining by enterprise system 110 for purposes of machine learning training. It will be seen that scatterplot analysis as described in connection with FIG. 7A can be useful in a variety of other instances, e.g. to confirm a conversation strategy data tag associated with enterprise system presented content where the content is prompted for content based on a key input and/or vocal utterance of an enterprise agent user or for confirmation of a conversation strategy tag classification in the case that a presentment of conversation content has included one or more conversation text segment from segments area 2122 of data repository 108 combined with other content.

Figure 8:
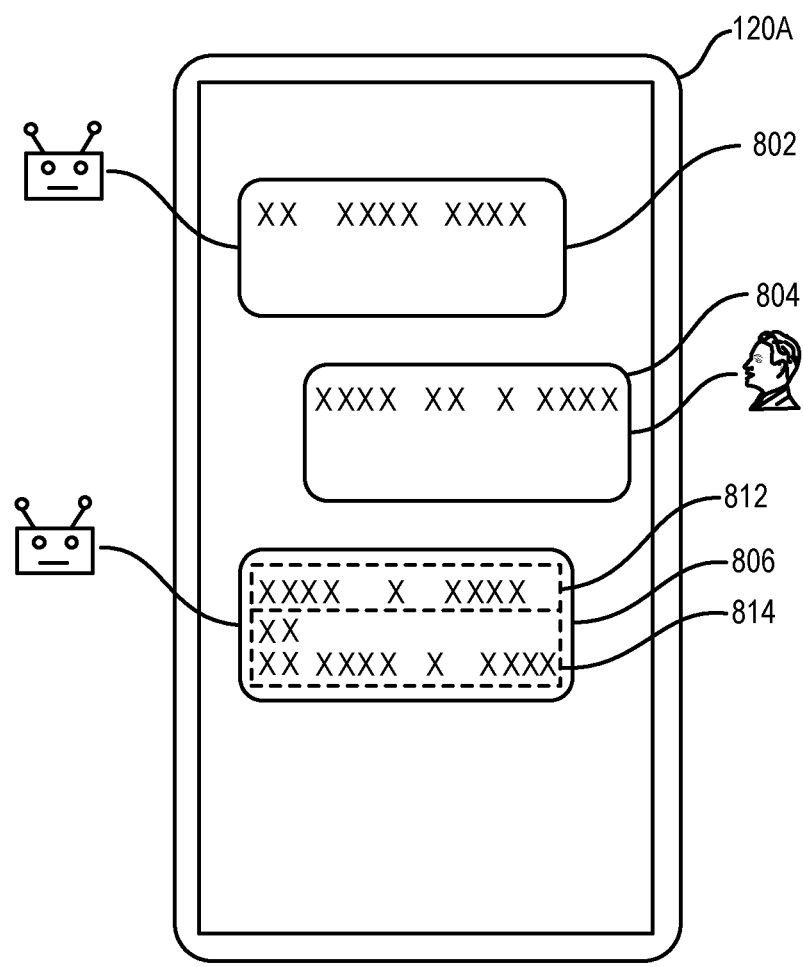
FIG. 8 depicts a client computer device in which conversation content is presented to a user in dependence on user feedback data according to one embodiment.

Additional features of system 100 are described in connection with FIG. 8 depicting client computer device 120A. Conversation content depicted within area 802 can be conversation content automatically generated by enterprise system 110 associated to a first message segment of enterprise system 110. The conversation content depicted within area 804 can be conversation content of a user of client computer device 120A. Conversation content depicted within area 804 can be conversation content of a user message segment where the user message segment succeeds the first enterprise system message segment associated to area 802. Conversation content depicted within area 806 refers to a second message segment of enterprise system 110. Conversation content of area 806 can be conversation content of a second message segment of enterprise system 110 during a current interactive user support session. The second message segment of enterprise system 110 can succeed the first message segment of the user associated to area 804. Area 806 can include first subarea 812 and second subarea 814. Subarea 814 can include baseline content that is independent of conversation text segments stored in segments area 2122 of data repository 108 having conversation text segments associated to respective particular conversation strategies. Subarea 812 can include a conversation text segment obtained from segments area 2122 that is associated to a particular conversation strategy. Shown as being an IVR session, the session depicted in FIG. 8 can alternatively be a guided session.

Embodiments herein can apply an optimized e-commerce strategy at an intelligently selected time for a chat interaction/alternate engagement. Embodiments herein can learn over time which strategies work best for a user in interactive user support session. Embodiments herein can iterate through communication strategies in an organized way for customer engagement taking similar product-customer progressions and stacking user's inflection points.

A system herein can include a corpus of content associated to a plurality of differentiated conversations strategies. Conversation strategies herein can include, e.g. (a) empathy, (b) statistical reasoning, (c) paint new reality, (d) fear of missing out, (e) comparison with others, or (f) build trust and rapport.

Embodiments herein can keep track a user agreeability graph for an entire conversation using natural language processing sentiment analysis. Embodiments herein can iteratively change an active conversation strategy until a current sentiment of a user is observed to improve, as may be indicated by a feature of tracked sentiment pattern data such as a rising or falling inflection point. When exhibited sentiment of a user is observed to improve according to one embodiment, a conversation strategy for engaging a user can be selected by maintaining a current conversation strategy (the one active at the time of sentiment improvement). When exhibited sentiment of a user is observed to decline according to one embodiment, a conversation strategy for engaging a user can be selected by switching to a new conversation content.

Embodiments herein can iteratively activate a plurality of different conversation strategies for a time period where user's sentiment over time does not improve. Embodiments herein can include monitoring for changes in sentiment while an active conversation strategy is changed. On the detection of a feature such as a rising inflection point, the currently active conversation strategy can be maintained.

Embodiments herein can include iteratively storing datasets for performance of machine learning training during an interactive user support session. The datasets can include e.g. an identifier for the user, an identifier for domain for a most recent message segment, a value for sentiment or more general satisfaction level for a most recent time segment, and one or more conversation strategy identifier data tag. Embodiments herein can include using the returned data of the returned datasets for selecting a conversation strategy. For example, on identification of a most recent domain and user, an enterprise system can query a predictive model that returns data that specifies a best performing conversation strategy for the certain user for the certain domain. On identification of a most recent domain and user and sentiment of the user, an enterprise system can query a predictive model that returns a best performing conversation strategy for the certain user for the most recent domain (in most instances the domain of the current interactive support session). Recorded data such as the recorded datasets stored during an interactive user support session can be used to train one or more predictive model for return of action decisions.

Embodiments herein can include a system capturing reusable genericized promotion techniques, capturing user history with each technique, plotting the agreeability of the user for each technique at a given time, and utilizing effective seed conversations for promoting the given product. The mentioned system can detect an optimum reengagement point based on conversational progress and user's reaction to previous promotions. The optimal engagement point can be based on a detected inflection point according to one embodiment. The mentioned system can be provided not just directly as an input to virtual agents, but as a guidance for human agents to guide the user to effective communication methods with a given customer user. The mentioned system can capture contextual indicators to ensure that the user doesn't feel overwhelmed by these strategies based on strategy attempt count or user language.

Embodiments herein can understand the sentiment of an ongoing conversation and can plot the agreeability of the user in real-time as indicated by the sentiment of the user. The system has the capability to contain an existing set of knowledge corpus, which can include a list of seed conversation strategies for providing support to users. The system has the capability to try different strategies during the conversation with the user and to determine whether an inflection point has occurred or not. The system can detect the strategy at the inflection point and can store the data along with user information and domain, which can be used in the future for future interaction with the user.

Embodiments herein can include a set of chatbot or other messaging strategies on domains created by subject matter experts with a combination of "domain", "domain entities", "domain intents", "domain content catalog" (all the four previous can be the same across different strategies), "strategy name", a detailed description of the dialogs to be used for the specific strategy and some sample scores for sentiment (positive, neutral, negative, mixed), emotion (joy, sadness, anger, disgust, fear) and other sentiment parameters (analytical, confident, tentative) commonly associated with the strategy. When there is a new user, a system herein can generate a specific user ID and can initiate a conversation with a "starting conversation" strategy to identify the proper domain the user wants to converse about. Once the user describes what they are looking for, embodiment herein can utilize a classification algorithm (i.e.: Neural Network Classifier) or a semantic proximity search (i.e.: word2vec, ELMo or BERT) to find the proper domain to be used. Since this is a new user, randomly select a strategy from the domain and continue the dialog.

Embodiments herein can generate an overall metric that specifies a user's satisfaction level with a current conversation. In one embodiment, a satisfaction level of a user can be in dependence on natural language processing extracted sentiment data of the user. An output sentiment value can be used to indicate satisfaction level. Multi-dimensional sentiment values can also be used, e.g. positive response scores can be provided on the basis of (i.e.: joy, confident, analytical and tentative scores) and the negative scores can be provided e.g. on the basis of the combination of (fear, anger, sadness, disgust) to generate a single number that represents the satisfaction level with the response according to one embodiment.

A data repository can store the user ID, domain, strategy, and sentiment scores for a specific interaction, as well as text conversation segments associated respectively to different conversation strategies. If the overall satisfaction score for the current strategy is below a set threshold, there can be selected a different strategy from database A for the same domain, e.g. by calculating the cosine or Euclidean distance between the previous interaction sentiment, emotion and tone scores with the strategies' commonly associated scores. Embodiments herein can utilize the closest strategy (given it's not the same as the current) in the next interaction, calculate the metrics and store interaction into database B until the overall satisfaction score is above the threshold. When the user comes back, embodiments herein can include implementing the "starting conversation" strategy to identify the proper domain a user wants to chat about and lookup from database B the strategy with the optimal satisfaction score and implement it.

Certain embodiments herein may offer various technical computing advantages involving computing advantages to address problems arising in the realm of computer networks. Embodiments herein can accelerate operation of a user interface. In one embodiment, an enterprise system can examine history data in connection with feedback data of a user that indicates a user's satisfaction with an interactive user support session. In response to a determination that a current conversation strategy is not optimally performing, embodiments herein can provide for transitioning to an alternate conversation strategy. Embodiments herein can include subjecting received conversation content of a user to natural language processing for extraction of topic and sentiment data tags as well as other natural language processing data tags. Extracted data can then be used for training of a predictive model by machine learning processes. Once trained, a predictive model can be queried for return of one or more predicted outcome. Prediction data specifying a predicted outcome can be used for return of action decisions such as action decisions to activate a user engagement according to certain classification. A fundamental aspect of operation of a computer system is its interoperation with entities to which it interfaces including human actors. By increasing the accuracy and reliability of information presented to human users, embodiments herein increase the level of engagement of human users for enhanced computer system operation. Various decision data structures can be used to drive artificial intelligence (AI) decision making, such as decision data structure that cognitively maps social media interactions in relation to posted content in respect to parameters for use in better allocations that can include allocations of digital rights. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms and machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 9:
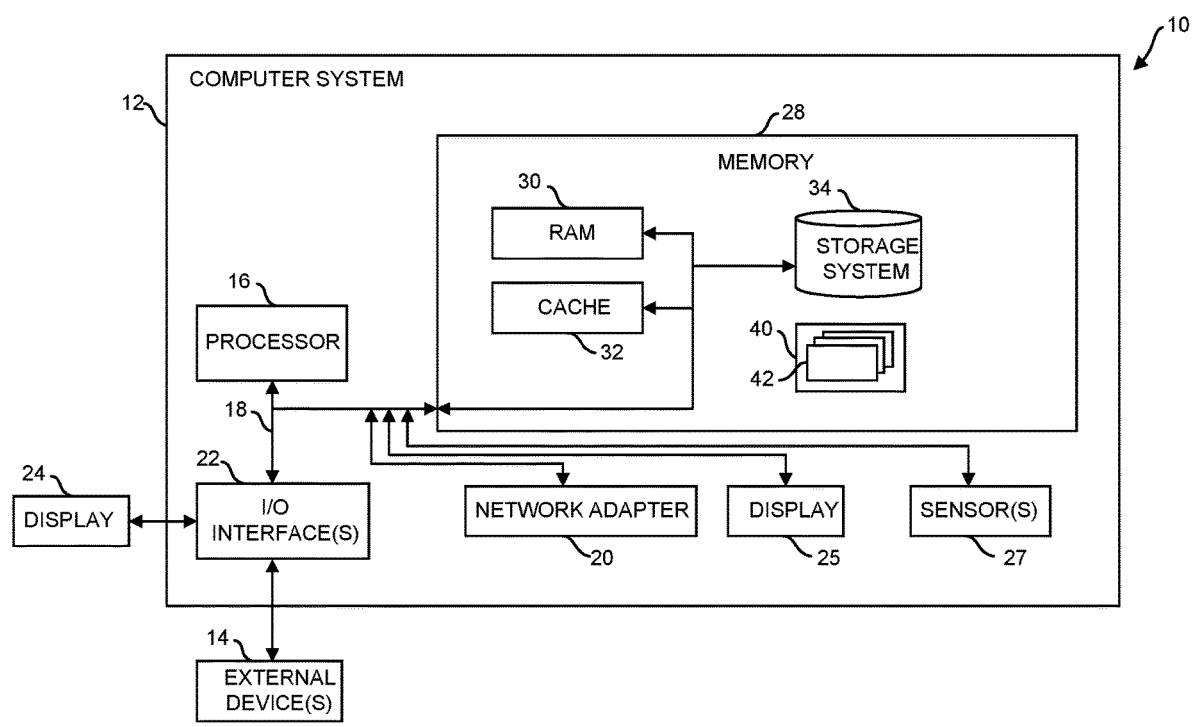
FIG. 9 depicts a computing node according to one embodiment.
Figure 10:
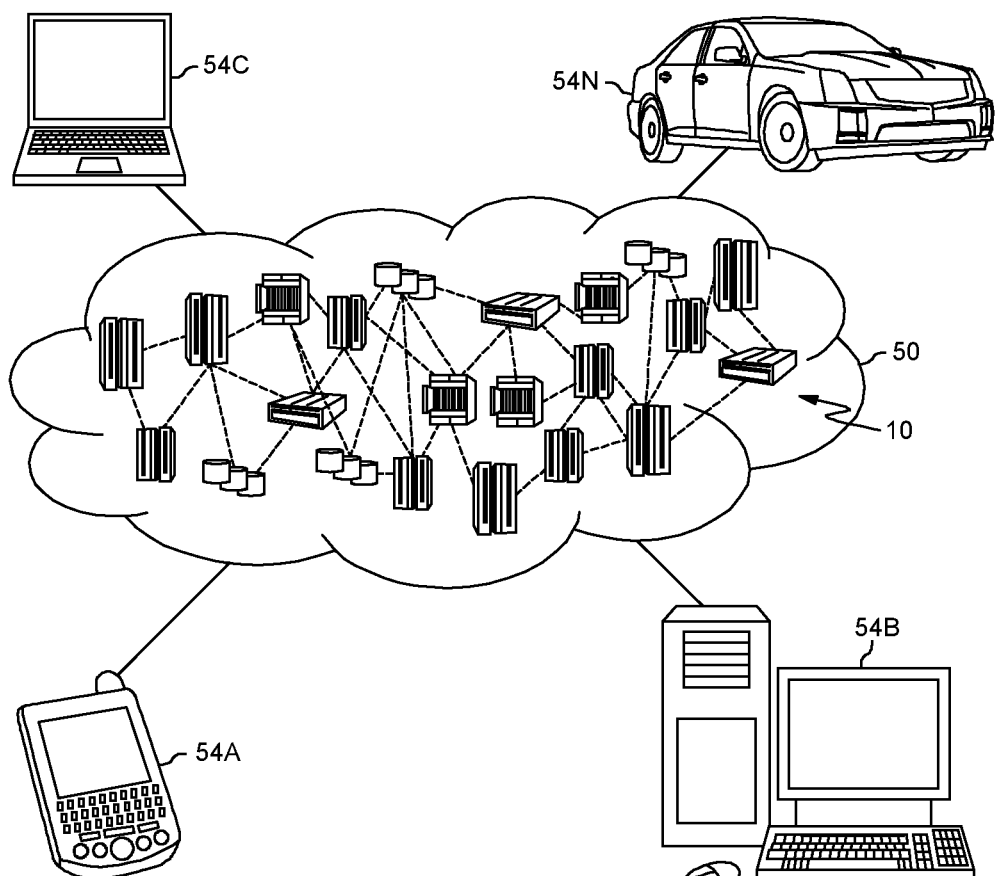
FIG. 10 depicts a cloud computing environment according to one embodiment.
Figure 11:
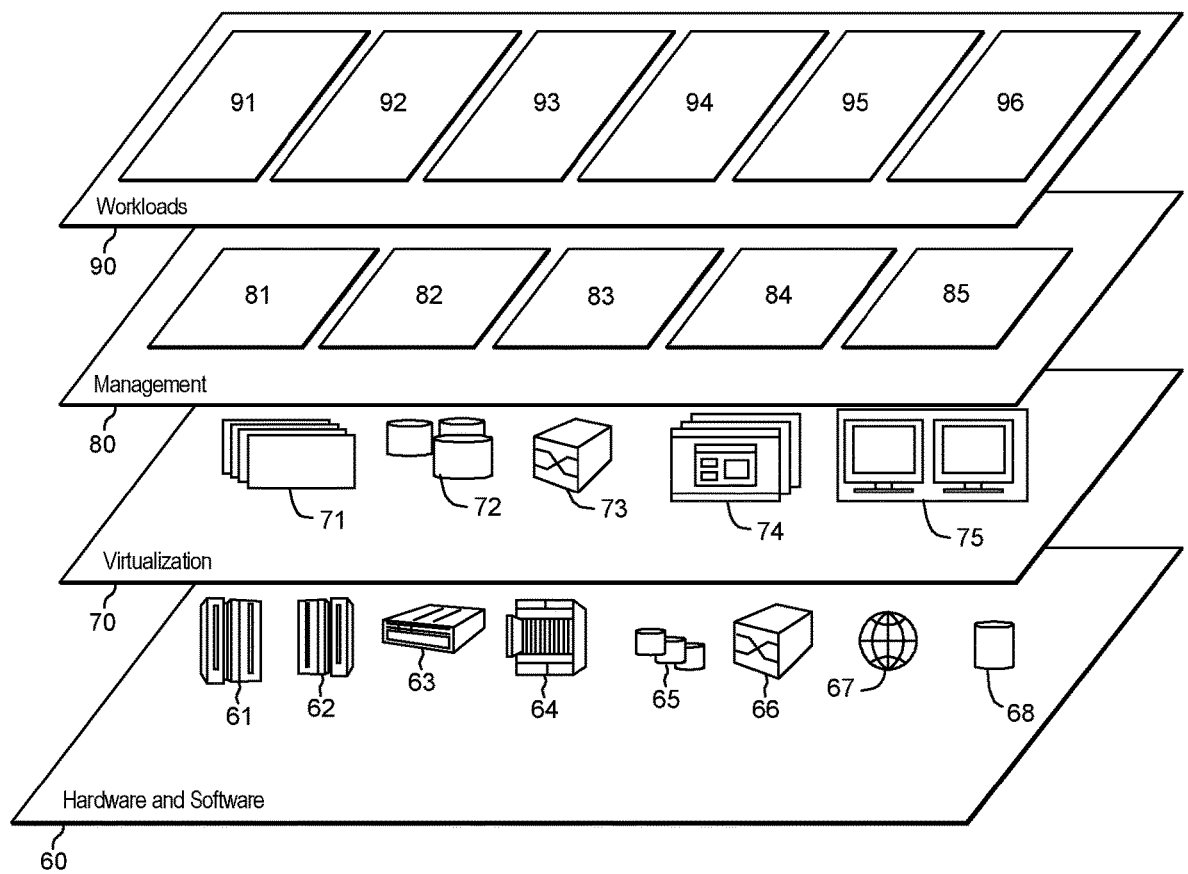
FIG. 11 depicts abstraction model layers according to one embodiment.

FIGS. 9-11 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment or can be implemented as a computing node in a computing environment other than a cloud computing environment.

In computing node 10, there is a computer system 12 which is operational with numerous other general purposes or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 9, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 10-11.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, enterprise system 110 can include one or more computing node 10 and can include one or more program 40 for performing functions described with reference to enterprise system 110 as set forth in the flowchart of FIG. 2. In one embodiment, client computer device 120A can include one or more computing node 10 and can include one or more program 40 for performing functions described with reference to one or more client computer device 120A as set forth in the flowchart of FIG. 2. In one embodiment, client computer device 130A can include one or more computing node 10 and can include one or more program 40 for performing functions described with reference to one or more administrator client computer device 130A as set forth in the flowchart of FIG. 2. In one embodiment, the computing node based systems and devices depicted in FIG. 1 can include one or more program for performing functions described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12, in one embodiment, can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 10 computing node 10 is described as being implemented in a cloud computing environment and accordingly is referred to as a cloud computing node in the context of FIG. 10.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for determination of interactive content for presentment of a user as set forth herein. The processing components 96 can be implemented with use of one or more program 40 described in FIG. 9.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements but is not limited to possessing only those one or more steps or elements. Likewise, a step of a method or an element of a device that "comprises," "has," "includes," or "contains" one or more features possesses those one or more features but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way but may also be configured in ways that are not listed.

It is contemplated that numerical values, as well as other values that are recited herein, are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
obtaining during an interactive user support session user transmitted data including conversation content from a client computing device associated to the user;
subjecting the user transmitted data to processing to provide feedback data associated to the conversation content obtained from the client computer device, wherein the feedback data indicates a level of satisfaction of the user, and wherein the processing includes subjecting content of the conversation content to natural language processing to return sentiment data of the user;
examining data of the feedback data;
performing selecting of a conversation strategy in dependence on the examining, wherein the performing selecting results in selection of a certain conversation strategy amongst a plurality of candidate conversation strategies that are referenced in a data repository; and sending for presentment to the user returned conversation content in accordance with the certain conversation strategy.

2. The computer implemented method of claim 1, wherein the examining includes identifying a feature within satisfaction level pattern data of the user defined by satisfaction level values for the user over time during the interactive user support session, wherein the selecting of the conversation strategy includes transitioning to a new conversation strategy, and wherein a time of the transitioning is in dependence on timing data of the feature.

3. The computer implemented method of claim 1, wherein the examining includes identifying a feature within sentiment pattern data of the user defined by sentiment values for the user over time during the interactive user support session, wherein the selecting of the conversation strategy includes transitioning to a new conversation strategy, and wherein a time of the transitioning is in dependence on timing data of the feature.

4. The computer implemented method of claim 1, wherein the examining includes examining sentiment pattern data of the user defined by returned sentiment values of the user over time and identifying a feature of the sentiment pattern data of the user.

5. The computer implemented method of claim 1, wherein the examining includes examining sentiment pattern data of the user defined by returned sentiment values of the user over time, and identifying a feature of the sentiment pattern data of the user, the feature being an inflection point, wherein the selecting includes transitioning to a new conversation strategy based on the inflection point being identified.

6. The computer implemented method of claim 1, wherein the examining includes examining sentiment pattern data of the user defined by returned sentiment values of the user over time, and identifying a feature of the sentiment pattern data of the user, the feature being a regression line slope transition point, wherein the selecting includes transitioning to a new conversation strategy based on the regression line slope transition point being identified.

7. The computer implemented method of claim 1, wherein the obtaining conversation content from a user of a client computing device includes obtaining successive segments of conversation content of the user, and recording into a data repository for respective ones of the successive segments the following (a) an identifier for the user, (b) an identifier for a domain, (c) a sentiment value for the user, and (d) a conversation strategy identifier associated to presented conversation content presented to the user prior to the obtained conversation content, wherein the method includes training a predictive model using data of (a)-(d), wherein the method includes querying the predictive model for return of performance data specifying a predicted performance of one or more of the candidate conversation strategies, and in a subsequent iteration of the selecting using the performance data for selection of a subsequent conversation strategy and sending for presentment to the user subsequent returned conversation content in accordance with the subsequent conversation strategy.

8. The computer implemented method of claim 1, wherein the obtaining conversation content from a user of a client computing device includes obtaining successive segments of conversation content of the user, and recording into a data repository for respective ones of the successive segments the following (a) an identifier for the user, (b) an identifier for a domain, (c) a sentiment value for the user, and (d) a conversation strategy identifier associated to presented conversation content presented to the user prior to the obtained conversation content, (e) a preceding conversation strategy identifier associated to conversation content presented to the user prior to the presented conversation content, wherein the method includes training a predictive model using data of (a)-(e), wherein the method includes querying the predictive model for return of performance data specifying a predicted performance of one or more of the candidate conversation strategies, and in a subsequent iteration of the selecting using the performance data for selection of a subsequent conversation strategy and sending for presentment to the user subsequent returned conversation content in accordance with the subsequent conversation strategy.

9. The computer implemented method of claim 1, wherein the method includes in response to receiving registration data of the user by an enterprise system, sending to the client computer device a web browser plugin for installation on the client computer device, wherein the method includes receiving from the web browser plugin of the client computer device conversation associated data, the conversation associated data being associated to a conversation mediated by a computing node based system external to a computing node based system that mediates the interactive user support session, wherein the method incudes using the conversation associated data to train a predictive model, and wherein the performing selecting of a conversation strategy includes querying the predictive model.

10. The computer implemented method of claim 1, wherein the method includes receiving from the client computer device associated to the user conversation associated data, the conversation associated data being associated to a conversation mediated by a computing node based system external to a computing node based system that mediates the interactive user support session, wherein the method includes subjecting the conversation associated data to natural language processing to extract natural language processing output parameters associated to the conversation associated data, examining the natural language processing output parameters to heuristically derive a conversation strategy identifier for the conversation associated data, using the conversation strategy identifier to train a predictive model, and wherein the performing selecting of a conversation strategy includes querying the predictive model.

11. The computer implemented method of claim 1, wherein the obtaining during an interactive user support session user transmitted data includes obtaining biometric data of a the user from a biometric sensor disposed in the client computer device, speed data that specifies a speed with which the user presses a keypad of the client computer device, and force data that specifies a force with which the user pressed the keypad of the client computer device, and wherein the subjecting the user transmitted data to processing to provide the feedback data that indicates a level of satisfaction of the user includes processing each of the biometric data, the speed data, and the force data, and wherein the subjecting the user transmitted data to processing is performed so that the feedback data that indicates a level of satisfaction of the user is dependent on the biometric data, the speed data, the force data, and the sentiment data.

12. The computer implemented method of claim 1, wherein the data repository stores differentiated conversation text segments associated to respective ones of the candidate conversation strategies, and wherein the performing selecting of a conversation strategy in dependence on the examining includes selecting from the data repository a text segment associated to the selected conversation strategy, and wherein the sending for presentment to the user returned conversation content in accordance with the certain conversation strategy includes using the selected conversation text segment.

13. The computer implemented method of claim 1, wherein the examining data of the feedback data includes applying a function defined by a set of weighted factors, wherein a first factor of the set of weighted factors is an historical data factor in which an historical behavior of the user in response to being exposed to conversation content according to different conversation strategies is evaluated with use of a predictive model trained by machine learning, wherein a second factor is a current sentiment wherein a most recent sentiment value of the user is evaluated, and wherein a third factor is a sentiment pattern factor in which a current sentiment pattern defined by sentiment values over time of the user are evaluated.

14. The computer implemented method of claim 1, wherein the examining data of the feedback data is in dependence on an historical data factor in which an historical behavior of the user in response to being exposed to conversation content according to a sequence of different conversation strategies is evaluated with use of a predictive model trained by machine learning.

15. The computer implemented method of claim 1, wherein the obtained conversation content of the user is voice based content, and wherein the method includes converting the voice based content using speech to text conversion, wherein the data repository stores differentiated conversation text segments associated to respective ones of the candidate conversation strategies, and wherein the performing selecting of a conversation strategy in dependence on the examining includes selecting from the data repository a text segment associated to the selected conversation strategy, wherein the sending for presentment to the user returned conversation content in accordance with the certain conversation strategy includes using the selected conversation text segment, and wherein the sending for presentment to the user returned conversation content includes performing the presenting with use of a synthesized voice reading of the selected conversation text segment.

16. The computer implemented method of claim 1, wherein the subjecting content of the conversation content to natural language processing includes performing the subjecting to return topic identifiers associated to the conversation content, and using the topic identifiers to train a predictive model so that the predictive model learns trends of the user in response to being presented content that are dependent on subject matter domain of the content.

17. The computer implemented method of claim 1, wherein the examining includes identifying a feature within sentiment pattern data of the user defined by sentiment values for the user over time during the interactive user support session, wherein the selecting of the conversation strategy includes transitioning to a new conversation strategy, and wherein a time of the transitioning is in dependence on timing data of the feature, wherein the feature is an inflection point, wherein the obtaining conversation content from a user of a client computing device includes obtaining successive segments of conversation content of the user, and recording into a data repository for respective ones of the successive segments the following (a) an identifier for the user, (b) an identifier for a domain, (c) a sentiment value for the user, and (d) a conversation strategy identifier associated to presented conversation content presented to the user prior to the obtained conversation content, (e) a preceding conversation strategy identifier associated to conversation content presented to the user prior to the presented conversation content, wherein the method includes training a predictive model using data of (a)-(e), wherein the method includes querying the predictive model for return of performance data specifying a predicted performance of one or more of the candidate conversation strategies, and in a subsequent iteration of the selecting using the performance data for selection of a subsequent conversation strategy and sending for presentment to the user subsequent returned conversation content in accordance with the subsequent conversation strategy, wherein the method includes receiving from the client computer device associated to the user conversation associated data, the conversation associated data being associated to a conversation mediated by a computing node based system external to a computing node based system that mediates the interactive user support session, wherein the method includes subjecting the conversation associated data to natural language processing to extract natural language processing output parameters associated to the conversation associated data, examining the natural language processing output parameters to heuristically derive a conversation strategy identifier for the conversation associated data, using the conversation strategy identifier to train a predictive model, and wherein the performing selecting of a conversation strategy includes querying the predictive model.

18. The computer implemented method of claim 1, wherein the examining includes identifying a feature within sentiment pattern data of the user defined by sentiment values for the user over time during the interactive user support session, wherein the selecting of the conversation strategy includes transitioning to a new conversation strategy, and wherein a time of the transitioning is in dependence on timing data of the feature, wherein the feature is an inflection point, wherein the obtaining conversation content from a user of a client computing device includes obtaining successive segments of conversation content of the user, and recording into a data repository for respective ones of the successive segments the following (a) an identifier for the user, (b) an identifier for a domain, (c) a sentiment value for the user, and (d) a conversation strategy identifier associated to presented conversation content presented to the user prior to the obtained conversation content, (e) a preceding conversation strategy identifier associated to conversation content presented to the user prior to the presented conversation content, wherein the method includes training a predictive model using data of (a)-(e), wherein the method includes querying the predictive model for return of performance data specifying a predicted performance of one or more of the candidate conversation strategies, and in a subsequent iteration of the selecting using the performance data for selection of a subsequent conversation strategy and sending for presentment to the user subsequent returned conversation content in accordance with the subsequent conversation strategy, wherein the method includes in response to receiving registration data of the user by an enterprise system, sending to the client computer device a web browser plugin for installation on the client computer device, wherein the method includes receiving from the web browser plugin, wherein the method includes receiving from the web browser plugin of the client computer device associated to the user conversation associated data, the conversation associated data being associated to a conversation mediated by a computing node based system external to a computing node based system that mediates the interactive user support session, wherein the method includes subjecting the conversation associated data to natural language processing to extract natural language processing output parameters associated to the conversation associated data, examining the natural language processing output parameters to heuristically derive a conversation strategy identifier for the conversation associated data, using the conversation strategy identifier to train a predictive model, and wherein the performing selecting of a conversation strategy includes querying the predictive model, wherein the obtained conversation content of the user is voice based content, and wherein the method includes converting the voice based content using speech to text conversion, wherein the data repository stores differentiated conversation text segments associated to respective ones of the candidate conversation strategies, and wherein the performing selecting of a conversation strategy in dependence on the examining includes selecting from the data repository a text segment associated to the selected conversation strategy, and wherein the sending for presentment to the user returned conversation content in accordance with the certain conversation strategy includes using the selected conversation text segment, and wherein the sending for presentment to the user returned conversation content includes performing the presenting with use of a synthesized voice reading of the selected conversation text segment, wherein the subjecting content of the conversation content to natural language processing includes performing the subjecting to return topic identifiers associated to the conversation content, and using the topic identifiers to train a predictive model so that the predictive model learns trends of the user in response to being presented content that are dependent on subject matter domain of the content, wherein the examining data of the feedback data includes applying a function defined by a set of weighted factors, wherein a first factor of the set of weighted factors is an historical data factor in which an historical behavior of the user in response to being exposed to conversation content according to different conversation strategies is evaluated with use of the predictive model trained by machine learning, wherein a second factor is a current sentiment wherein a most recent sentiment value of the user is evaluated, and wherein a third factor is a sentiment pattern factor in which a current sentiment pattern defined by sentiment values over time of the user are evaluated.

19. A computer program product comprising:
a computer readable storage medium readable by one or more processing circuit and storing instructions for execution by one or more processor for performing a method comprising:
obtaining during an interactive user support session user transmitted data including conversation content from a client computing device associated to the user;
subjecting the user transmitted data to processing to provide feedback data associated to the conversation content obtained from the client computer device, wherein the feedback data indicates a level of satisfaction of the user, and wherein the processing includes subjecting content of the conversation content to natural language processing to return sentiment data of the user;
examining data of the feedback data;
performing selecting of a conversation strategy in dependence on the examining, wherein the performing selecting results in selection of a certain conversation strategy amongst a plurality of candidate conversation strategies that are referenced in a data repository; and
sending for presentment to the user returned conversation content in accordance with the certain conversation strategy.

20. A system comprising:
a memory;
at least one processor in communication with the memory; and
program instructions executable by one or more processor via the memory to perform a method comprising:
obtaining during an interactive user support session user transmitted data including conversation content from a client computing device associated to the user;
subjecting the user transmitted data to processing to provide feedback data associated to the conversation content obtained from the client computer device, wherein the feedback data indicates a level of satisfaction of the user, and wherein the processing includes subjecting content of the conversation content to natural language processing to return sentiment data of the user;
examining data of the feedback data;
performing selecting of a conversation strategy in dependence on the examining, wherein the performing selecting results in selection of a certain conversation strategy amongst a plurality of candidate conversation strategies that are referenced in a data repository; and
sending for presentment to the user returned conversation content in accordance with the certain conversation strategy.

* * * * *